US009685871B2

(12) United States Patent
Takahashi et al.

(10) Patent No.: US 9,685,871 B2
(45) Date of Patent: Jun. 20, 2017

(54) SWITCHING POWER SUPPLY APPARATUS AND SEMICONDUCTOR DEVICE

(71) Applicant: PANASONIC CORPORATION, Osaka (JP)

(72) Inventors: Kensuke Takahashi, Hyogo (JP); Takashi Saji, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 205 days.

(21) Appl. No.: 14/275,348

(22) Filed: May 12, 2014

(65) Prior Publication Data

US 2014/0328090 A1    Nov. 6, 2014

Related U.S. Application Data

(63) Continuation of application No. PCT/JP2012/004676, filed on Jul. 24, 2012.

(30) Foreign Application Priority Data

Nov. 28, 2011 (JP) ................ 2011-258908

(51) Int. Cl.
  *H02M 3/335* (2006.01)
  *H02M 1/44* (2007.01)

(52) U.S. Cl.
  CPC ... *H02M 3/33507* (2013.01); *H02M 3/33515* (2013.01); *H02M 1/44* (2013.01)

(58) Field of Classification Search
  CPC ......... H02M 3/33538; H02M 3/33546; H02M 3/33515; H02M 3/33576; H02M 3/33592;
  (Continued)

(56) References Cited

U.S. PATENT DOCUMENTS

| 2005/0200343 A1 | 9/2005 | Ueda |
| 2008/0309303 A1* | 12/2008 | Morota ............ H02M 3/33523 323/282 |

(Continued)

FOREIGN PATENT DOCUMENTS

| JP | 2008-312359 A | 12/2008 |
| JP | 2009-142085 A | 6/2009 |

(Continued)

OTHER PUBLICATIONS

International Search Report issued in PCT/JP2012/004676, dated Sep. 18, 2012, with English translation.

*Primary Examiner* — Harry Behm
*Assistant Examiner* — Bryan R Perez
(74) *Attorney, Agent, or Firm* — McDermott Will & Emery LLP

(57) ABSTRACT

A switching power supply apparatus includes a PFM control circuit that outputs a clock signal Set such that a switching frequency of a switching element varies in accordance with a load state. The clock signal Set determines a turn-on timing of the switching element. A reference value of a current flowing through the switching element determines a turn-off timing of the switching element. A modulation signal is applied to the turn-off timing of the switching element to modulate one of a peak value of a drain current flowing through the switching element and an on-time of the switching element. Input control is performed separately on the clock signal Set and the modulation signal. Accordingly, even when the clock signal Set and the modulation signal contribute to each other to offset each other, modulation effects are not cancelled.

13 Claims, 17 Drawing Sheets

(58) Field of Classification Search
CPC ......... H02M 3/33553; H02M 3/33507; H02M 3/337; H02M 3/338; H02M 3/3381; H02M 3/3382; H02M 3/3384
USPC ............ 363/18, 19, 20, 21.01, 21.04, 21.05, 363/21.07, 21.08, 21.09, 21.11, 21.12, 363/21.13, 21.15, 21.16, 21.17, 21.18, 363/21.1
See application file for complete search history.

(56) References Cited

U.S. PATENT DOCUMENTS

| | | | |
|---|---|---|---|
| 2009/0147547 A1* | 6/2009 | Yamashita | H02M 3/33507 363/21.16 |
| 2010/0008109 A1* | 1/2010 | Morota | H02M 3/33523 363/21.16 |
| 2010/0061129 A1 | 3/2010 | Fujii | |
| 2010/0321963 A1* | 12/2010 | Yamashita | H02M 3/33507 363/21.17 |
| 2013/0051088 A1* | 2/2013 | Yamashita | H02M 1/36 363/21.13 |

FOREIGN PATENT DOCUMENTS

| | | | | |
|---|---|---|---|---|
| JP | 2010-022121 A | 1/2010 | | |
| JP | 2010-063327 A | 3/2010 | | |
| JP | 4461842 B2 | 5/2010 | | |
| WO | WO 2011158284 A1 * | 12/2011 | | H02M 1/36 |

* cited by examiner

SWITCHING POWER SUPPLY APPARATUS AND SEMICONDUCTOR DEVICE

CROSS REFERENCE TO RELATED APPLICATION

This is a continuation application of PCT Application No. PCT/JP2012/004676 filed Jul. 24, 2012, designating the United States of America, which in turn claims the benefit of Japanese Application No. 2011-258908, filed on Nov. 28, 2011, the disclosures of which, including the specification, drawings and claims, is incorporated herein by reference in their entirety.

TECHNICAL FIELD

The present disclosure relates to a switching power supply apparatus that performs switching on an input voltage through a switching element to control an output voltage, and to a semiconductor device that constitutes the switching power supply apparatus.

BACKGROUND ART

Conventionally, as a power supply apparatus for general appliances for household use such as home electric appliances, a switching power supply apparatus has been widely used that includes a semiconductor device controlling an output voltage with use of a switching operation of a semiconductor (a switching element such as a transistor), for the purpose of improvement of power efficiency by reduction in power consumption.

Especially in recent years, there has been a demand for reduction in power consumption in electric appliances for prevention of global warming. Attention is particularly focused on power consumption in a standby mode of appliances having a standby function. There has been a great demand for a switching power supply apparatus having a lower power consumption in the standby mode.

Generally, in a light load state such as the standby mode or the like, a dominant energy loss in a switching power supply apparatus is a switching loss due to a switching operation. As one of known arts for improving the power efficiency in the light load state, power supply operation is performed under Pulse Frequency Modulation (PFM) control in which a switching frequency is decreased in accordance with a load current.

FIG. 17 shows a configuration example of a conventional switching power supply apparatus that includes a semiconductor device having a PFM control circuit.

As a load current output in a rated load state decreases, an output voltage increases. Regarding information indicating this increase of the output voltage, a feedback signal is input to an FB terminal via an output voltage detection circuit 5, and Pulse Width Modulation (PWM) control is performed such that a current flowing through a switching element 2 decreases in accordance with a value of a signal output from a feedback signal control circuit 11. A state under PWM control corresponds to a range A in FIG. 3, and a switching operation is performed at 100 kHz for example.

When the load further decreases, the switching power supply apparatus switches from PWM control to PFM control, and operates so as to vary a switching frequency of the switching element 2 in accordance with the load state. A state under PFM control corresponds to a range B in FIG. 3. PFM control is performed such that as the load decreases, a feedback current IFB increases, a voltage EAO decreases, and the switching frequency decreases. In this way, the switching power supply apparatus in a light load state reduces the number of switching operations by performing PFM control to reduce the sum of switching losses as much as possible, thereby to improve a power efficiency.

According to such a conventional switching power supply apparatus, however, when a load is constant, a switching frequency of a switching element operating a switching operation is fixed. This causes a problem that spectral components of a high-frequency current flowing through the switching element concentrate in the switching frequency and its harmonic components, and as a result noise (electrical noise) easily occurs. Such noise is called a high-frequency noise or a terminal noise. Components such as filter circuits against the noise are necessary, and this hinders size-reduction and cost-reduction of the switching power supply apparatus.

Here, the terminal noise represents a leakage voltage that is induced due to leakage of a switching frequency by a switching operation and harmonic components thereof from a commercial AC power supply to the outside. A magnitude of the terminal noise is expressed by indicators such as a peak value that is the maximum amplitude value of the noise, a quasi-peak (Qp) value that is close to the peak value and varies depending on an amplitude and a frequency of the noise, and an average value. When the switching frequency is constant, the peak value, the Qp value, and the average value are equal to each other with no variation. The standard value of the average value is set lower than the standard value of the Qp value. However, in the case where the Qp value and the average value are equal to each other as described above, the Qp value needs to be decreased to the average value.

Also, there is a case where when a load of a switching power supply apparatus operating under PFM control decreases, the switching power supply apparatus operates at an frequency in an audible frequency region of 20 kHz or less (hereinafter, referred to as audible region). In particular, when there is a small variation in load in a standby mode or the like, if a switching frequency is fixed at a particular frequency in the audible region, sound is sometimes generated from a transformer, a ceramic capacitor, and so on which are generally used in the switching power supply apparatus.

In response to this, a measure may be taken in which the minimum switching frequency under PFM control is set to greater than 20 kHz beyond the audible region. It is true that this measure prevents generation of sound in the transformer, the ceramic capacitor, and so on. Even in the light load state, however, the number of performance of switching increases due to the minimum switching frequency which is set high. This results in increase in switching loss to hinder improvement of power efficiency.

In addition to the above measure, there are known measures such as a measure of performing PFM control by skipping the audible region, and a measure of impregnating the transformer, the ceramic capacitor, and so on with a resin or the like. However, these measures cause increase in area of circuits, increase in cost, and so on. As a result, there arises a demand for improvement in the trade-off relationship between performance and cost.

In response to the demand for suppression of noise occurrence as described above, there have conventionally been proposed switching power supply apparatuses such as disclosed in Patent Literatures 1 and 2. The switching power supply apparatuses such as disclosed in Patent Literatures 1 and 2 can reduce an average value of a terminal noise by diffusing a switching frequency of a switching element within a predetermined frequency range.

CITATION LIST

Patent Literature

[Patent Literature 1] Japanese Patent No. 4461842
[Patent Literature 2] Japanese Patent Application Publication No. 2008-312359
[Patent Literature 3] Japanese Patent Application Publication No. 2009-142085

SUMMARY OF INVENTION

Technical Problem

According to the switching power supply apparatus disclosed in Patent Literature 1, when a load is fixed, a modulation signal is applied to a switching frequency to diffuse frequency spectrum components, thereby to reduce the average value of the terminal noise. However, an A/D converter necessary for this decrease needs to be provided, and this results in increase in area of circuits and increase in cost. Furthermore, there is another problem that an effect is not exhibited unless the load is fixed to a magnitude of a certain degree.

Also, according to the switching power supply apparatus disclosed in Patent Literature 2, a cyclic modulation signal is applied to a switching frequency by a PFM frequency modulation circuit to diffuse frequency spectrum components, thereby to reduce the average value of the terminal noise. The increase in area of circuits and the increase in cost are suppressed compared with the switching power supply apparatus described in Patent Literature 1. However, a feedback signal and a modulation signal which vary in accordance with a load state are input as elements for determining a turn-on timing of a switching element. When the load cyclically varies for example, the feedback signal and the modulation signal contribute to each other to offset each other, and modulation effects are canceled. As a result, the modulation effects are not exhibited or the switching power supply apparatus becomes unstable as a power supply apparatus due to excessive modulation.

Moreover, Patent Literatures 1 and 2 do not mention that a measure against sound generation of components such as a transformer and a ceramic capacitor should be taken as a problem to be solved, despite concentration of the switching frequency in a specific frequency band in an audible region under PFM control.

The present disclosure was made in view of the above, and aims to provide a switching source supply apparatus and a semiconductor device included therein that controls modulation of a switching frequency, in the switching source supply apparatus operating under PFM control in which a switching frequency varies in accordance with a load state, in order to stably and effectively an average value of a terminal noise and reduce sound generation of a transformer, a ceramic capacitor, and so on due to operation in an audible frequency region.

Solution to Problem

In order to solve the above problem, a switching power supply apparatus comprises: a transformer that includes a primary coil and a secondary coil; a switching element that is connected in series with the primary coil; a control circuit configured to control a switching operation of the switching element to perform switching control on a first DC voltage that is input to the switching element via the primary coil; an output voltage generation unit configured to convert an AC voltage induced in the secondary coil due to the switching operation to a second DC voltage, and supply a power to a load; and an output voltage detection circuit configured to detect variation of the second DC voltage, and output a feedback signal generated in accordance with the variation to the control circuit, the feedback signal being for the switching control wherein the control circuit includes: a feedback signal control circuit configured to vary a switching frequency of the switching element in accordance with the feedback signal output from the output voltage detection circuit, such that the variation of the second DC voltage is cancelled; a PFM control circuit configured to generate a turn-on signal for turning on the switching element at the switching frequency determined by the feedback signal control circuit; a current detection circuit configured to detect a value of a current flowing through the switching element; a current control circuit configured to, when the value of the current detected by the current detection circuit reaches a reference value, generate a turn-off signal for turning off the switching element; and a current peak modulation unit configured to cyclically modulate a peak value of the current flowing through the switching element within a current range of a first value to a second value.

Here, the output voltage detection circuit outputs the feedback signal to control a turn-on timing of the switching element, the current peak modulation unit outputs a modulation signal to control a turn-off timing of the switching element, and the control circuit separately performs input control on the feedback signal and the modulation signal.

Advantageous Effects of Invention

According to the present disclosure as described above, even when there is a small variation in load in a standby mode or the like and the frequency is within an audible region, the switching frequency at this time is modulated, and as a result energy of the switching frequency and a harmonic frequency thereof is diffused, and a peak value decreases. As a result, a problem specific to the PFM control, in which sound is generated from a transformer, a capacitor, and so on during operations in the audible region, is easily reduced with a comparative simple configuration. This allows a switching power supply apparatus having a limited operating frequency range for fear of sound generation and so on to perform frequency operations in a wide operating frequency range. Also, it is possible to omit special measures against sound generation such as a measure of adhering the transformer and a measure of impregnating the transformer, and a special control circuit for reducing sound generation.

Also, input control is separately performed on an output signal for determining the switching frequency and a modulation signal for modulating the switching frequency. With this configuration, even when the output signal and the modulation signal contribute to each other to offset variation thereof, modulation effects are not cancelled. Accordingly, compared with conventional arts, an average value of a terminal noise is stably and effectively reduced, thereby to lead to reduction of filter components against noise.

Also, under a conventional PFM control, when an input is low, when a load is heavy, when an output is high, when a capacitance of an input electrolytic capacitor is high, or the like, an input ripple voltage increases. An input voltage varies in accordance with the increase of the input ripple voltage. As a result, modulation effects are exhibited. However, according to a DC input switching power supply apparatus, when the capacitance of the input electrolytic capacitor is low, when the input is high where the input ripple voltage is low, when the load is light where the switching frequency tends to concentrate in an audible region, when the output is low, or when substantially no input ripple voltage is induced, there is no diffusion of the switching frequency due to the ripple voltage. Accordingly, the switching frequency of the switching element is fixed as long as an output load is constant. As a result, an average value of a terminal noise equals to the Qp value, and this needs measures against noise. The present disclosure is highly effective in such a switching power supply apparatus.

The present disclosure allows modification of the switching frequency in any load state, and therefore exhibits a high effectiveness.

DESCRIPTION OF EMBODIMENTS

The following specifically describes a switching power supply apparatus and a semiconductor device as embodiments of present disclosure, with reference to the drawings.

<Embodiment 1>

Figure 1:
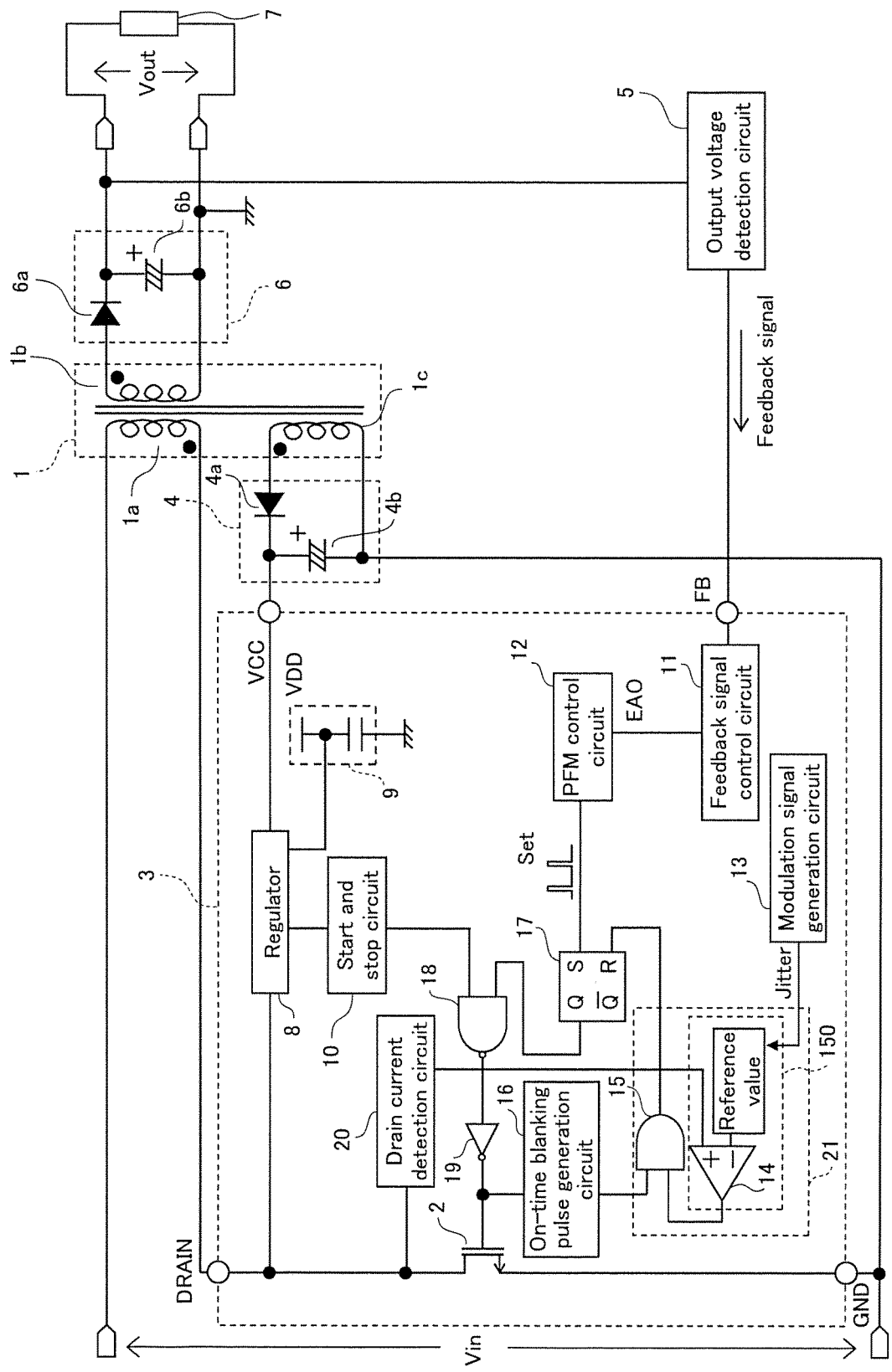
FIG. 1 is a circuit diagram of a switching power supply apparatus relating to Embodiment 1.

FIG. 1 is a circuit diagram showing a configuration example of a switching power supply apparatus that includes a semiconductor device for controlling a switching power relating to Embodiment 1.

As shown in FIG. 1, a transformer 1 includes a primary coil 1a, a secondary coil 1b, and an auxiliary coil 1c. The primary coil 1a and the secondary coil 1b are opposite in polarity to each other. This switching power supply apparatus is of a flyback type.

A switching element 2 constituting part of a control circuit 3 is connected with the primary coil 1a. A switching operation of the switching element 2 is controlled through variation of a voltage to be applied to a control electrode (gate) of the switching element 2.

The switching element 2 and other part that constitute the control circuit 3 are integrated on the same semiconductor substrate, and constitute a single semiconductor device. The switching element 2 is a power MOSFET or the like.

Note that the switching element 2 and the other part, which constitute the control circuit 3, do not necessarily need to be arranged on the same semiconductor substrate. For example, the following configuration may be employed. The switching element 2 and the other part, which constitute the control circuit 3, are arranged on separate semiconductor substrates. On one of the semiconductor substrates on which the part, which constitute the control circuit 3, is arranged, an OUT terminal is provided for outputting a signal output from the part. Furthermore, the OUT terminal is connected with the gate of the switching element 2 which is arranged on the other semiconductor substrate.

The control circuit 3 includes, as external input and output terminals, four terminals of a DRAIN terminal, an FB terminal, a GND terminal, and a VCC terminal. The VCC terminal is a power source voltage terminal for power supply to the control circuit 3.

The following briefly describes the control circuit 3. The control circuit 3 performs PFM control to control the switch operation of the switching element 2, thereby to maintain a constant output voltage of the switching power supply apparatus. The control circuit 3 controls the switching element 2 to perform the switch operation, by inputting a clock signal Set to S (set) of an RS flip-flop circuit 17. Also, the control circuit 3 detects a current flowing through the switching element 2. When the detected current reaches a predetermined value, the control circuit 3 inputs a turn-off signal to R (reset) to turn off the switching element 2. As a result, the switch frequency of the switching element 2 is cyclically modulated.

The DRAIN terminal is a terminal that is connected with a connection point between the primary coil 1a of the transformer 1 and the switching element 2, namely, a terminal connected with a drain of the switching element 2.

The GND terminal is a terminal that connects each of a source of the switching element 2 and GND of the control circuit 3 with a ground level. The GND terminal is connected with a terminal having a lower potential included in two terminals to which a DC voltage Vin is applied.

Note that, in the present disclosure, the switching element 2 may be a power switching element other than the power MOSFET. In the case where an insulated gate bipolar transistor (IGBT) is used for example, COLLECTOR and EMITTER of the IGBT correspond to DRAIN and SOURCE of the power MOSFET.

The VCC terminal is a terminal that connects a rectifying and smoothing circuit 4 constituted from a rectifying diode 4a and a smoothing capacitor 4b with a regulator 8 included in the control circuit 3. The VCC terminal rectifies and smoothes an AC voltage induced in the auxiliary coil 1c due to the switching operation of the switching element 2, and inputs the AC voltage after rectifying and smoothing to the control circuit 3 as an auxiliary power source voltage VCC.

The FB terminal is a terminal that inputs a feedback signal such as a current induced by a phototransistor, which is output from the output voltage detection circuit 5, to the feedback signal control circuit 11 included in the control circuit 3.

Note that, instead of inputting the feedback signal to the FB terminal, the auxiliary power source voltage VCC, which results from rectifying and smoothing the AC voltage induced in the auxiliary coil 1c, may be input to the feedback signal control circuit 11 included in the control circuit 3 via the output voltage detection circuit 5.

The regulator 8 is connected between the DRAIN terminal and the VCC terminal of the switching element 2, a start and stop circuit 10, and an internal circuit voltage source 9 included in the control circuit 3. When an input DC voltage Vin is applied to the DRAIN terminal of the switching element 2 via the transformer 1, the regulator 8 supplies a current from the DRAIN terminal to the capacitor 4b of the rectifying and smoothing circuit 4 via the VCC terminal to charge the smoothing capacitor 4b. This results in increase of the auxiliary power source voltage VCC, which is a voltage output from the rectifying and smoothing circuit 4.

When a voltage of the VCC terminal increases to a starting voltage of the control circuit 3, the regulator 8 suspends current supply from the DRAIN terminal to the VCC terminal. Then, a current is supplied from the smoothing capacitor 4b of the rectifying and smoothing circuit 4 to the internal of the control circuit 3 via the VCC terminal. Here, the auxiliary power source voltage VCC is equivalent to a voltage resulting from rectifying and smoothing the voltage of the auxiliary coil 1c, that is, a charging voltage of the smoothing capacitor 4b. Also, when the voltage of the VCC terminal decreases to a stop voltage of the control circuit 3, a current is supplied from the DRAIN terminal to the VCC terminal like before startup, and the voltage of the VCC terminal increases again. The internal circuit voltage source 9 is controlled by the regulator 8 so as to have a constant value.

The start and stop circuit 10 monitors the voltage of the VCC terminal, and controls the switching element 2 to start and stop in accordance with a value of the voltage of the VCC terminal. When the voltage of the VCC terminal increases to the starting voltage, the start and stop circuit 10 outputs an H level voltage to one of input terminals of a NAND circuits 18. When the voltage of the VCC terminal decreases to the stop voltage, the start and stop circuit 10 outputs an L level voltage to the other input terminal of the NAND circuit 18. Here, the H level is a predetermined voltage level that is higher than 0 V such as a power source voltage VDD, and the L level is a ground (GND) level.

The feedback signal control circuit 11 outputs a voltage signal EAO for controlling the switching frequency of the switching element 2 so as to stabilize an output DC voltage Vout, in accordance with a feedback signal which is input to the FB terminal of the control circuit 3 from the output voltage detection circuit 5. The voltage output from the feedback signal control circuit 11 performs control, such that when the load is light and the output DC voltage Vout increases, the switching frequency of the switching element 2 decreases, and when the load is heavy and the output DC voltage Vout decreases, the switching frequency of the switching element 2 increases.

Figure 2:
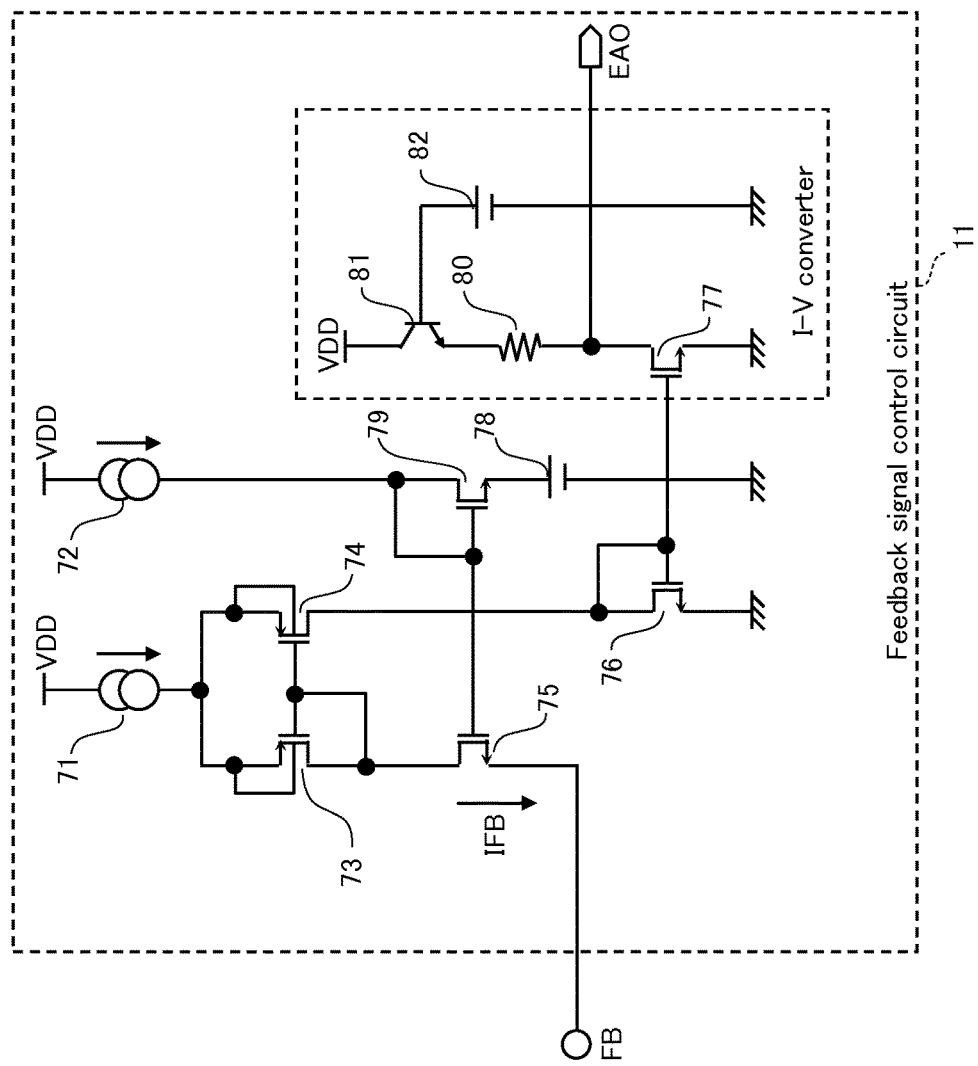
FIG. 2 is a circuit diagram of a feedback signal control circuit relating to Embodiment 1.

FIG. 2 shows the configuration of the feedback signal control circuit 11.

In FIG. 2, reference numerals 71 and 72 each represent a constant current source, reference numerals 73 and 74 each represent a P-MOSFET, and reference numerals 75, 76, 77, and 79 each represent an N-MOSFET. Also, reference numerals 78 and 82 each represent a constant voltage source, reference numeral 80 represents a resistor, reference numeral 81 represents an NPN bipolar transistor. The N-MOSFET 77, the resistor 80, the NPN bipolar transistor 81, and the constant voltage source 82 constitute an I-V converter. The P-MOSFETs 73 and 74 constitute a mirror circuit, and the N-MOSFET 76 and 77 constitute a mirror circuit.

The constant current sources 71 and 72 each set current limitation when the FB terminal short-circuits with the GND. The voltage EAO which is converted by the I-V converter is determined in accordance with current flowing through the resistor 80, and varies as shown in Expression 1 below.

[Math 1]

$$VEAO = VR - Vbe - R \times I \qquad \text{Expression 1}$$

Here, VEAO denotes an output voltage of the I-V converter, VR denotes a constant voltage of the constant voltage source 82, Vbe denotes a B-E voltage of the NPN bipolar transistor 81, R denotes a resistance of the resistor 80, and I denotes a current flowing through the resistance 80.

As clear from Expression 1, as the current I flowing through the resistance 80 increases, the output voltage EAO decreases. Also, the voltage EAO which is output from the feedback signal control circuit 11 is used for controlling the switching frequency for PFM control.

In other words, as the current flowing from the FB terminal increases, the output voltage EAO decreases and as a result the switching frequency of the switching element 2 decreases. Also, as the current flowing from the FB terminal decreases, the output voltage EAO increases and as a result the switching frequency of the switching element 2 increases.

Figure 3A:
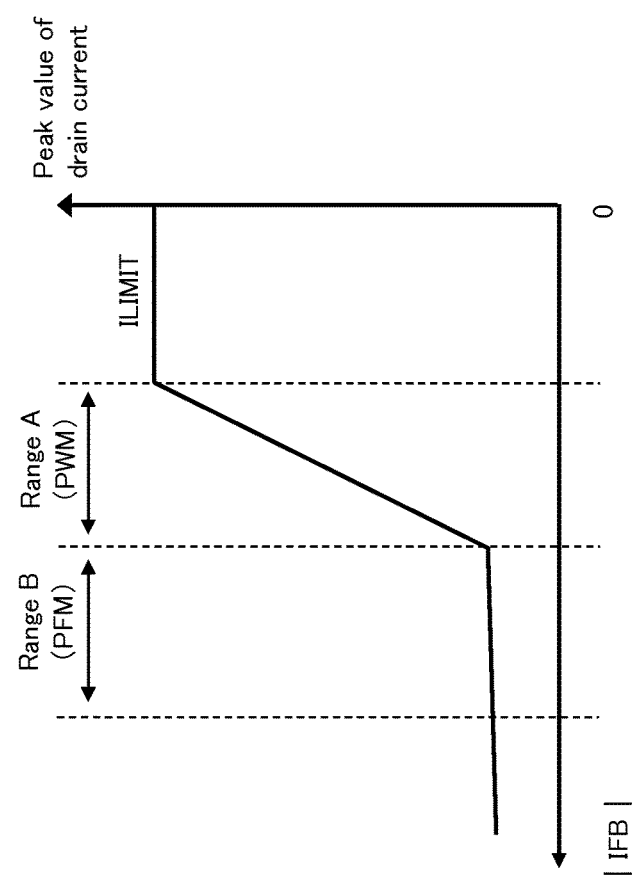
FIGS. 3A and 3B show, in a semiconductor device relating to Embodiment 1, an example of relationship between a feedback current and a switching frequency and an example of relationship between a feedback current and a peak value of a drain current which can flow through a switching element.
Figure 3B:
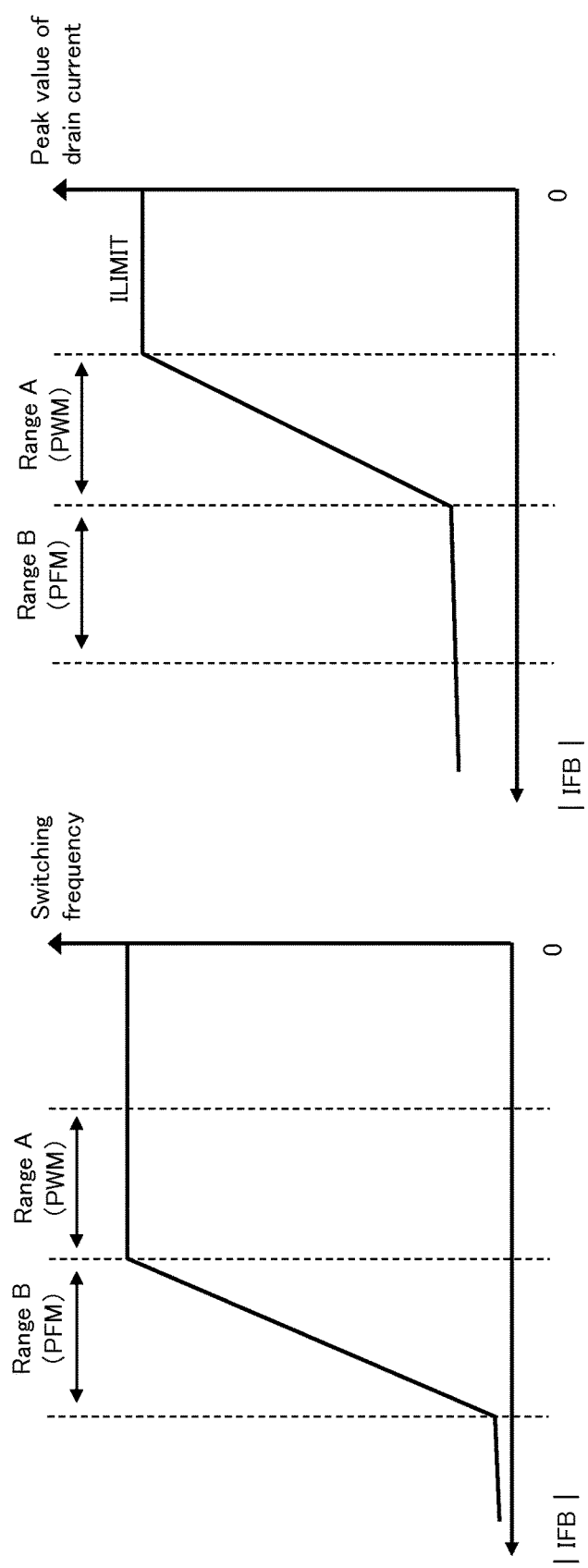

FIG. 3A shows, an example of relationship between a feedback current IFB and the switching frequency of the switching element 2, and FIG. 3B shows an example of relationship between the feedback current IFB and a peak value of a drain current flowing through the switching element 2.

As shown in FIGS. 3A and 3B, the switching power supply apparatus, which performs PWM control and PFM control in combination, detects a load state by the feedback signal control circuit 11, and switches between PWM control and PFM control based on a predetermined value.

Figure 17:
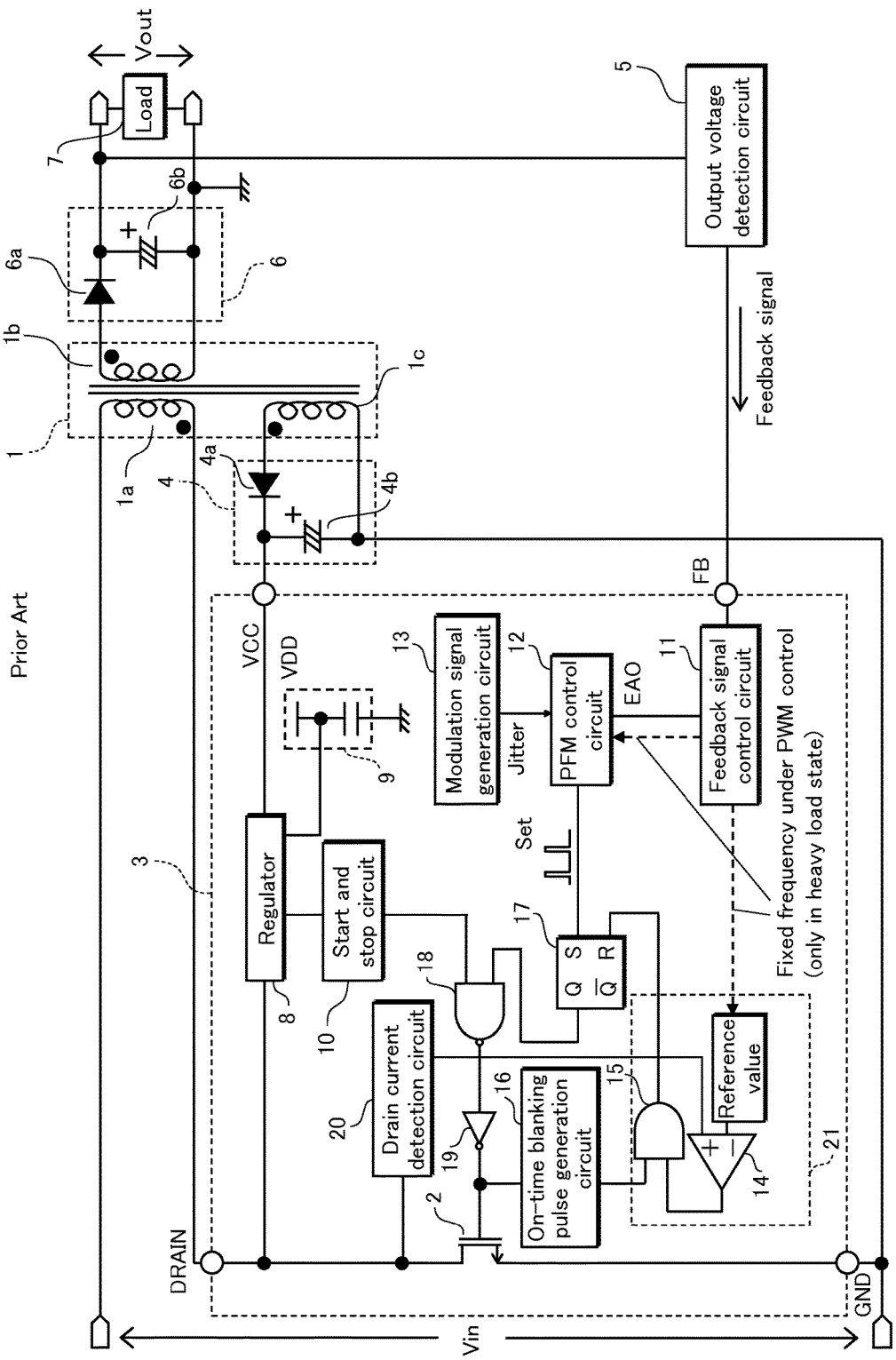
FIG. 17 is a circuit diagram of a switching power supply apparatus relating to a conventional example.

In a switching power supply apparatus such as shown in FIG. 17 for example, a switching power supply apparatus operates under PFM control when the load is lower than a predetermined value (light load), and operates under PWM control (or quasi-resonant control) when the load is equal to or higher than the predetermined value (heavy load). When control switches completely from PFM control to PWM control as a result of increase of the load to a certain degree, a frequency of a clock signal Set output from a PWM control circuit is controlled to be a fixed value such as 100 kHz. As a result, a current flowing through a switching element 2 is controlled to increase as the load increases in accordance with the feedback signal output from an output voltage detection circuit 5, that is, a feedback current IFB flowing from an FB terminal.

In the case where a frequency modulation unit for modulating the peak value of the drain current, which is included in the switching power supply apparatus relating to the present embodiment, the switching frequency is corrected by a feedback response for maintaining a constant output due to variation of a peak value of a drain current. There is a case where when the feedback response (feedback signal) greatly delays relative to the switching frequency, an output of a load instantaneously varies. For example, there is a case where when the load state under PFM control is immediately before switching to the load state under PWM control, the load state is judged to be under PWM control due to the variation of the output of the load despite that the load state is actually to be under PFM control.

Also, under PWM control, even when the peak value of the current is modulated, the switching frequency is fixed and is not modulated. Generally, as a modulation unit under PWM control, application of a modulation signal to the switching frequency is performed. Also, in the case where quasi-resonance control and PFM control are used in combination, the switching frequency is modulated by modulating the peak value of the current even when the quasi-resonance control is used, and accordingly it is unnecessary to switch the modulation unit. In the case where the PWM control and the PFM control are used in combination, however, the switching frequency is not modulated even if modulation of the peak value of the current is adopted as the modulation unit under PWM control, and accordingly it is necessary to switch the modulation unit under PWM control.

Also, there is a case where the switching power supply apparatus repeatedly switches between PFM control and PWM control at a high speed depending on the load state. In this case, switching of the modulation unit needs to be repeatedly performed at a high speed. This might result in no substantial modulation effect and unstable operations of the switching power supply apparatus.

In response to this problem, hysteresis control may be performed on switching of an operation mode when switching is performed between PWM control and PFM control, for example. Alternatively, a peak value of a drain current may be clamped.

A PFM control circuit 12 includes an oscillator that outputs a clock signal Set for turning on the switching element 2. The PFM control circuit 12 varies a frequency of the clock signal Set so as to maintain an output voltage Vo of the switching power supply apparatus at a constant value. The PFM control circuit 12 varies the frequency of the clock signal Set in accordance with a value of a conversion voltage EAO which is input from a feedback signal control circuit 11. Specifically, when the conversion voltage EAO increases, the PFM control circuit 12 increases the frequency of the clock signal Set. Conversely, when the conversion voltage EAO decreases, the PFM control circuit 12 decreases the frequency of the clock signal Set. The clock signal Set controls a turn-on timing of the switching element 2 thereby to vary the switching frequency of the switching element 2. This maintains the output voltage Vo of the switching power supply apparatus at a constant value.

Figure 4:
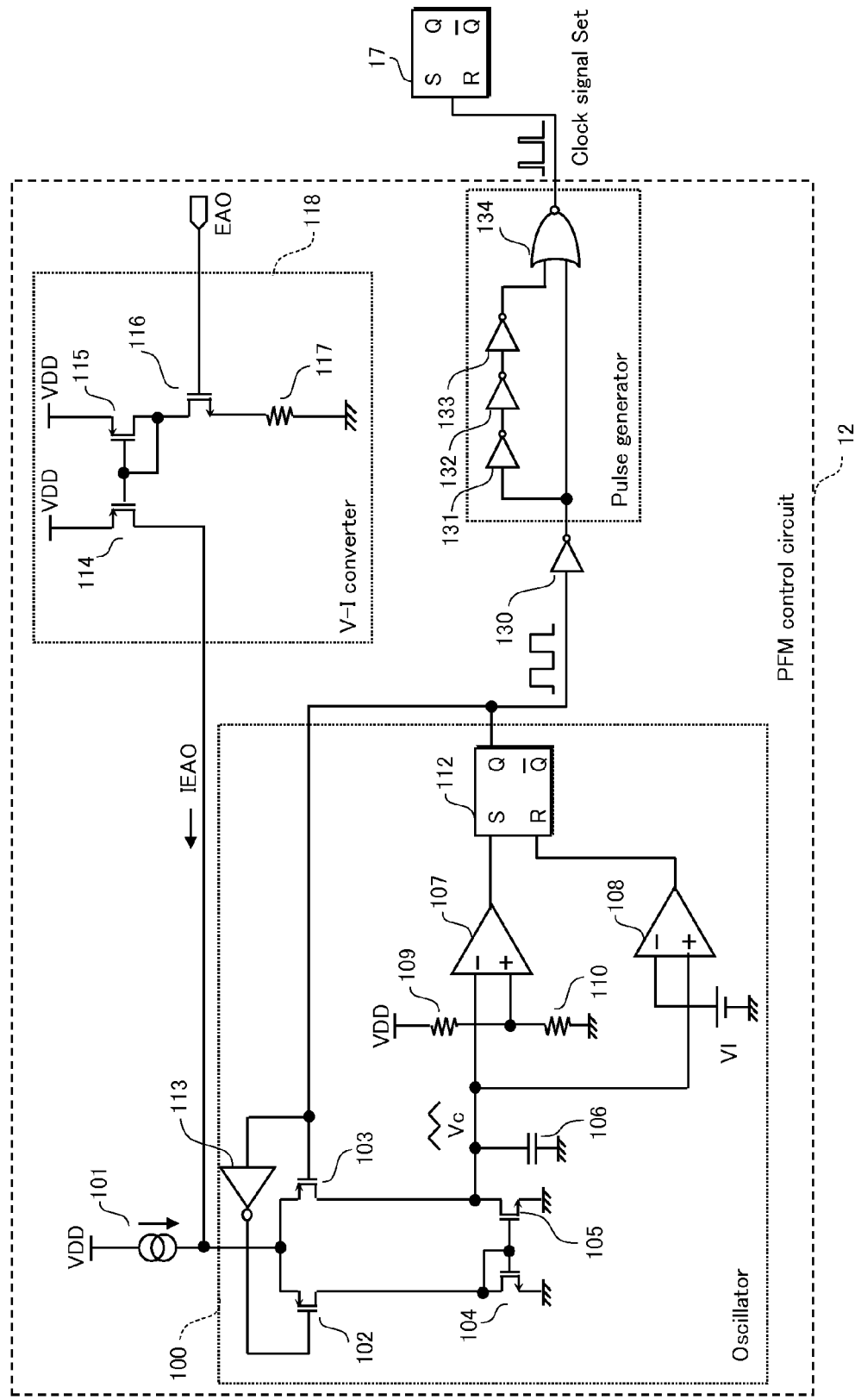
FIG. 4 is a circuit diagram of a PFM control circuit relating to Embodiment 1.

FIG. 4 shows the PFM control circuit 12 relating to Embodiment 1. The PFM control circuit 12 includes a V-I converter 118, a constant current source 101, and an oscillator 100. As shown in FIG. 4, elements are connected with each other. The V-I converter 118 converts a conversion voltage EAO corresponding to a feedback signal to a current signal IEAO. The current signal IEAO is superimposed on a constant current of the constant current source 101. A current signal resulting from superimposing the current signal IVEAO on the constant current of the constant current source 101 is input to the oscillator 100. A clock signal Set is output from the oscillator 100 via a pulse generator. As a result, since the frequency of the clock signal Set varies in accordance with variation of the load 7, the switching frequency of the switching element 2 also varies such that the output voltage Vo of the switching power supply apparatus is maintained constant.

When the clock signal Set which is input to the set (S) rises, the RS flip-flop circuit 17 switches to a set state. Also, when a reset signal is input to the reset (R) via an AND circuit 15, the RS flip-flop circuit 17 switches to a reset state. The RS flip-flop circuit 17 generates an output signal (first logic signal) having a level that switches between the H level and the L level, in accordance with whether the RS flip-flop circuit 17 is in the set state or the reset state. In other words, when the RS flip-flop circuit 17 is in the set state, the signal level of the output signal is high, and when the flip-flop circuit 17 is in the reset state, the signal level of the output signal is low.

A gate driver 19 generates a drive output signal for driving a control terminal (gate terminal) of the switching element 2 based on an output signal from the NAND circuit 18. Specifically, when a voltage level of the drive output signal of the gate driver 19 reaches the H level, the switching element 2 is turned on. When the voltage level of the drive output signal of the gate driver 19 reaches the L level, the switching element 2 is turned off.

The NAND circuit 18 generates an operational signal indicating a calculation result of the signal output from the RS flip-flop circuit 17 and an output signal from the regulator 8 which is described later.

In a starting state, an H level signal is output from the start and stop circuit 10, and accordingly an H level signal is input to one of the input terminals of the NAND circuit 18. Also, the clock signal Set is cyclically output from the PFM control circuit 12 in accordance with the load state, and accordingly an H level pulse signal is input to the set (S) of the RS flip-flop circuit 17. As a result, the output (Q) is at the H level, and an H level signal is also input to the other input terminal of the NAND circuit 18. Since an L level signal is output from the NAND circuit 18, an H level signal is output from the gate driver 19. As a result, the switching element 2 turns on.

A drain current detection circuit 20 functioning as a detection circuit for detecting a current flowing through a switching element is connected with the DRAIN terminal. The drain current detection circuit 20 detects an ON voltage determined based on a product of a drain current flowing through the switching element 2 and an ON resistance of the switching element 2 thereby to relatively detect a drain current flowing through the switching element 2. Then, the drain current detection circuit 20 generates a voltage signal Vis that is proportional to a value of the drain current, and outputs the generated voltage signal Vis to a plus (+) side of the comparator 14. When the voltage signal Vis equals a predetermined reference value, the comparator 14 outputs an H level signal to one of input terminals of the AND circuit 15.

Also, in the case where the switching element 2 and the control circuit 3 are formed in separate substrates, a sense resistor may be provided on a source (ground side) of the switching element 2 (specifically, the power MOSFET or the like) to detect a potential difference of the sense resistor and output a voltage signal corresponding to the potential difference to the plus side of the comparator 14.

After the gate driver 19 outputs a turn-on signal of the switching element 2, an on-time blanking pulse generation circuit 16 sets a certain blanking time so as not to erroneously detect a capacitive spike current and so on induced due to the capacitance of the switching element 2.

After elapse of the blanking time, the on-time blanking pulse generation circuit 16 outputs an H level signal to one of input terminals of the AND circuit 15.

A drain current limiting circuit 21 compares a predetermined reference voltage with a voltage Vis which is output from the drain current detection circuit 20. When the voltage Vis reaches the reference voltage and the switching element 2 turns on, an H level signal is input to both of the input terminals of the AND circuit 15 after elapse of the blanking time set by the on-time blanking pulse generation circuit 16. Accordingly, an H level signal is output from the AND circuit 15, and is input to the reset (R) of the RS flip-flop circuit 17. The drain current limiting circuit 21 includes a turn-off control circuit 150.

As a result, the output (Q) switches to the L level, and an L level signal is input to one of the input terminals of the NAND circuit 18. Accordingly, an L level signal is output from the gate driver 19, and the switching element 2 turns off.

The turn-off control circuit 150 receives input of a signal Vis, a reference value signal, and a signal Jitter, and outputs a turn-off control signal OFF. Here, the signal Jitter is generated by a modulation signal generation circuit 13 shown in FIG. 5. The modulation signal generation circuit 13 converts a triangular wave voltage which is generated by a low-frequency oscillator 50 to a current signal Jitter with use of a V-I converter, and outputs the signal Jitter as a cyclic current modulation signal.

Figure 7:
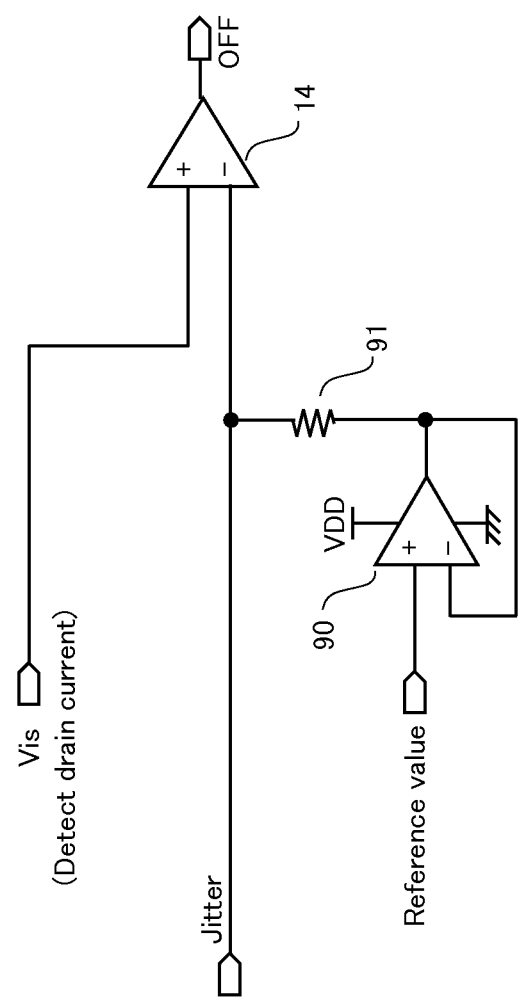
FIG. 7 is a circuit diagram of a drain current limiting circuit relating to Embodiment 1.

FIG. 7 shows the configuration of the turn-off control circuit 150.

Reference numeral 90 represents an operational amplifier, reference numeral 91 represents a resistor, and reference numeral 14 represents a comparator. The reference voltage, which is input from the feedback signal control circuit 11, is impedance-converted by the operational amplifier 90. The signal Jitter, which is input from the modulation signal generation circuit 13, is input as a voltage of a minus (−) side of the comparator 14, as the sum of a voltage induced due to a current flowing through the resistor 91 and the reference voltage. The signal Vis, which is input from the drain current detection circuit 20, is input as a voltage of the plus side of the comparator 14. When the signal Vis exceeds the reference voltage, the turn-off control signal OFF is input to the reset (R) of the RS flip-flop circuit 17, and as a result the switching element 2 turns off.

Through the above signal processing, the switching element 2 performs the switching operation. Also, an output voltage generation unit 6 that is constituted from a rectifying diode 6a and a smoothing capacitor 6b is connected with the secondary coil 1b. The output voltage generation unit 6 rectifies and smoothes an AC voltage induced in the secondary coil 1b due to the switching operation of the switching element 2, thereby to generate an output DC voltage Vout for supply to the load 7.

Also, the output voltage detection circuit 5 is made from an LED, a Zener diode, or the like. The output voltage detection circuit 5 detects the voltage level of the output DC voltage Vout, and outputs a feedback signal necessary for the control circuit 3 to control the switching operation of the switching element 2, so as to stabilize the output DC voltage Vout at a predetermined value.

According to this switching power supply apparatus, an AC power of a commercial AC power supply is rectified by a rectifier such as a diode bridge, and then is smoothed by an input capacitor, thereby to be converted to a DC voltage Vin. The DC voltage Vin is applied to the primary coil 1a of the transformer 1 for power conversion.

The following describes the operation of the switching power supply apparatus with the configuration shown in FIG. 1 and the semiconductor device for controlling the switching power supply apparatus.

When an AC power of a commercial AC power supply is input to the rectifier such as a diode bridge, the AC power is rectified and smoothed respectively by the rectifier and the input capacitor, thereby to be converted to a DC voltage Vin. The DC voltage Vin is applied to the DRAIN terminal via the primary coil 1a of the transformer 1, and a charging current for startup flows through the smoothing capacitor 4b, which is connected with the VCC terminal, from the DRAIN terminal via the regulator 8 included in the control circuit 3. When the voltage of the VCC terminal of the control circuit 3 reaches the starting voltage set by the start and stop circuit 10 due to the charging current, the control circuit 3 starts controlling the switching operation of the switching element 2.

Also, since the output voltage Vout at the secondary side is low at startup, the feedback signal output from the output voltage detection circuit 5 is not input to the feedback signal control circuit 11. Accordingly, the I-V converter included in the feedback signal control circuit 11 outputs a high converted voltage EAO, and oscillation starts at a high switching frequency and at a high peak value of the drain current under PWM control. In order to avoid this, a soft start function is provided for example such that the switching frequency and the peak value of the drain current gradually increase only at startup.

Once the switching element 2 turns on, a current flows through the switching element 2, and a voltage Vis corresponding to a value of the current flowing through the switching element 2 is input to the plus side of the comparator 14. After elapse of a blanking time set by the on-time blanking pulse generation circuit 16, when a signal Vis output from the drain current detection circuit 20 reaches a reference voltage which is determined at the minus side of the comparator 14, an H level signal is input to both of the input terminals of the AND circuit 15. Accordingly, an H level signal is output from the AND circuit 15 to the reset (R) of the RS flip-flop circuit 17, and the switching element 2 turns off.

When the switching element 2 turns off, energy stored in the primary coil 1a of the transformer 1 during the on-time of the switching element 2 is transmitted to the secondary coil 1b.

As a result of repetition of the switching operation as described above, the output DC voltage Vout increases. When the output DC voltage Vout reaches a voltage value which is set by the output voltage detection circuit 5, the output voltage detection circuit 5 performs control to flow a current from the FB terminal of the control circuit 3 as a feedback signal. The voltage EAO, which is converted by the I-V converter included in the feedback signal control circuit 11, decreases in accordance with a value of the current. The frequency of the clock signal Set is controlled to decrease in accordance with the decrease of the voltage EAO, thereby to adjust the switching frequency of the switching element 2.

In this way, the output DC voltage Vout is varied to an appropriate value. In other words, the switching element 2 turns on in accordance with the clock signal Set that is a pulse output from the PFM control circuit 12, and turns off when the current flowing through the switching element 2 reaches the reference value determined beforehand by the drain current limiting circuit 21.

That is, in a light load state where a low current is supplied to the load 7, the switching frequency, which is the number of times the current flows through the switching element 2, decreases, and in a high load state, the switching frequency, which is the number of times the current flows through the switching element 2, increases. As described above, the control circuit 3 performs control to vary the switching frequency of the switching element 2 in accordance with a power supplied to the load 7.

The reference voltage at the minus side of the comparator 14 cyclically varies within a certain range in accordance with a current signal Jitter which is output from the modulation signal generation circuit 13 and is cyclically modulated. As a result, the turn-off timing of the switching element 2 is modulated. The modulation signal generation circuit 13 is described in detail later, and accordingly description thereof is omitted here.

As described above, cyclic modulation of the reference voltage results in cyclic modulation of the peak value ILIMIT of the drain current. As a result, cyclic modulation of the switching frequency results in dispersion of the spectrum components of the switching frequency.

The following simply describes that the switching frequency of the switching element 2 is modulated as a result of cyclic modulation of the peak value of the drain current.

With respect to the peak value ILIMIT of the current flowing through the switching element 2, a relational expression shown in Expression 2 is satisfied.

[Math 2]

$$P = Io \times Vo = \frac{1}{2} \times L \times ILIMIT^2 \times f \times \eta \quad [W] \qquad \text{Expression 2}$$

According to Expression 2, when a load current Io is constant, variation of the peak value ILIMIT of the current flowing through the switching element 2 causes variation of the switching frequency f of the switching element 2. For example, as the peak value ILIMIT of the current increases, the switching frequency f decreases. Also, as the peak value ILIMIT of the current decreases, the switching frequency f increases. Accordingly, when the peak value of the current flowing through the switching element 2 cyclically and continuously varies within a current range of a first peak value to a second peak value, the switching frequency f cyclically and continuously varies within a frequency range of a first switching frequency to a second switching frequency in accordance with the variation of the peak value of the current.

In other words, the turn-off control circuit 150 modulates the turn-off timing of the switching element 2, thereby to modulate the peak value of the current flowing through the switching element 2. As a result, the switching frequency does not concentrate in a certain frequency in all the frequency operating range (all the load range) under PFM control even if the input voltage and the load are constant. This leads to diffusion of switching noise.

The switching power supply apparatus relating to the present embodiment includes the PFM control circuit 12 that outputs the clock signal Set such that the switching frequency of the switching element 2 varies in accordance with the load state. The turn-on timing of the switching element 2 is determined by the clock signal Set. The turn-off timing of the switching element 2 is determined by the reference value of the current flowing through the switching element 2. Input control is performed separately on the clock signal Set and the modulation signal, such that the turn-on timing is determined by the modulation signal, and the turn-off timing is determined by the clock signal Set through application of the modulation signal to the turn-off timing of the switching element 2. Accordingly, the feedback signal and the modulation signal do not contribute to each other to offset variation thereof. It is possible to stably and effectively modulate the peak value of the drain current flowing through the current switching element 2 thereby to cyclically modulate the switching frequency.

Figure 11:
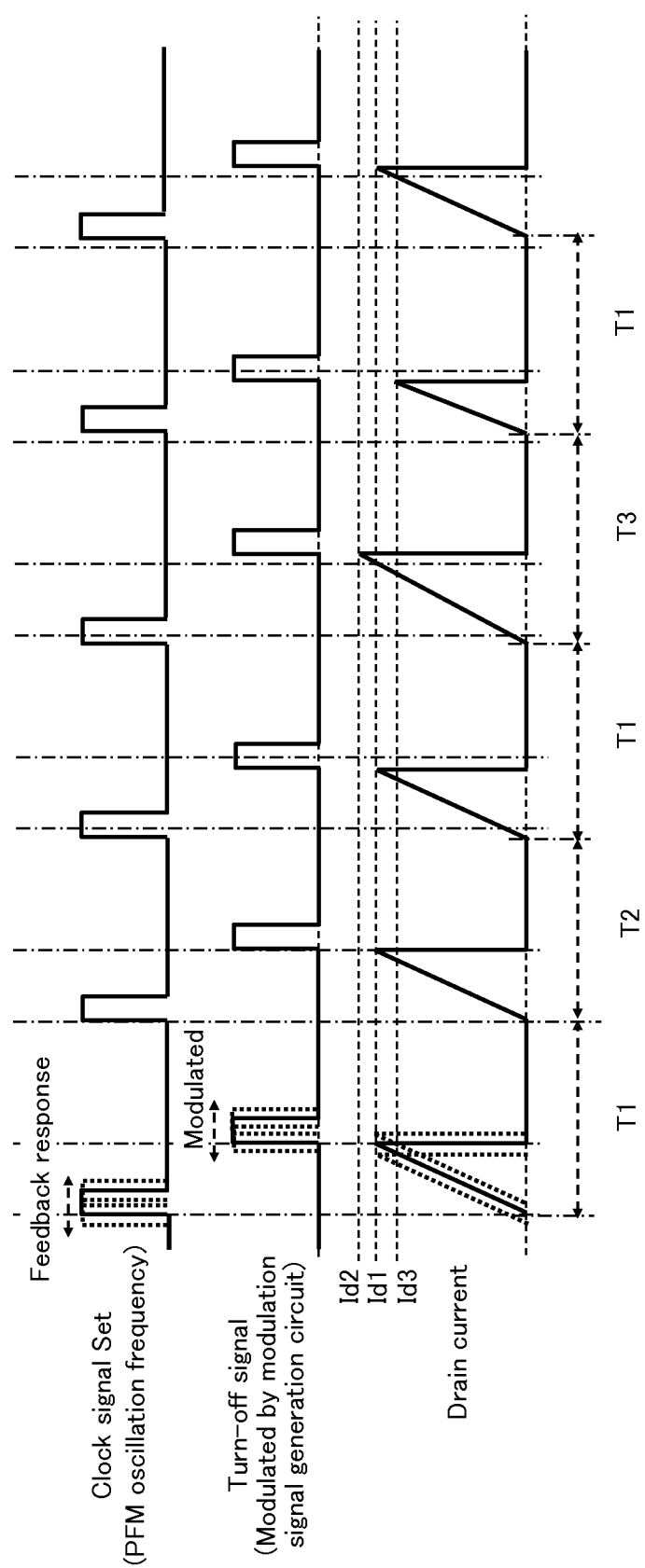
FIG. 11 is a timing chart showing modulation of a switching element in the switching power supply apparatus relating to Embodiment 1.
Figure 12:
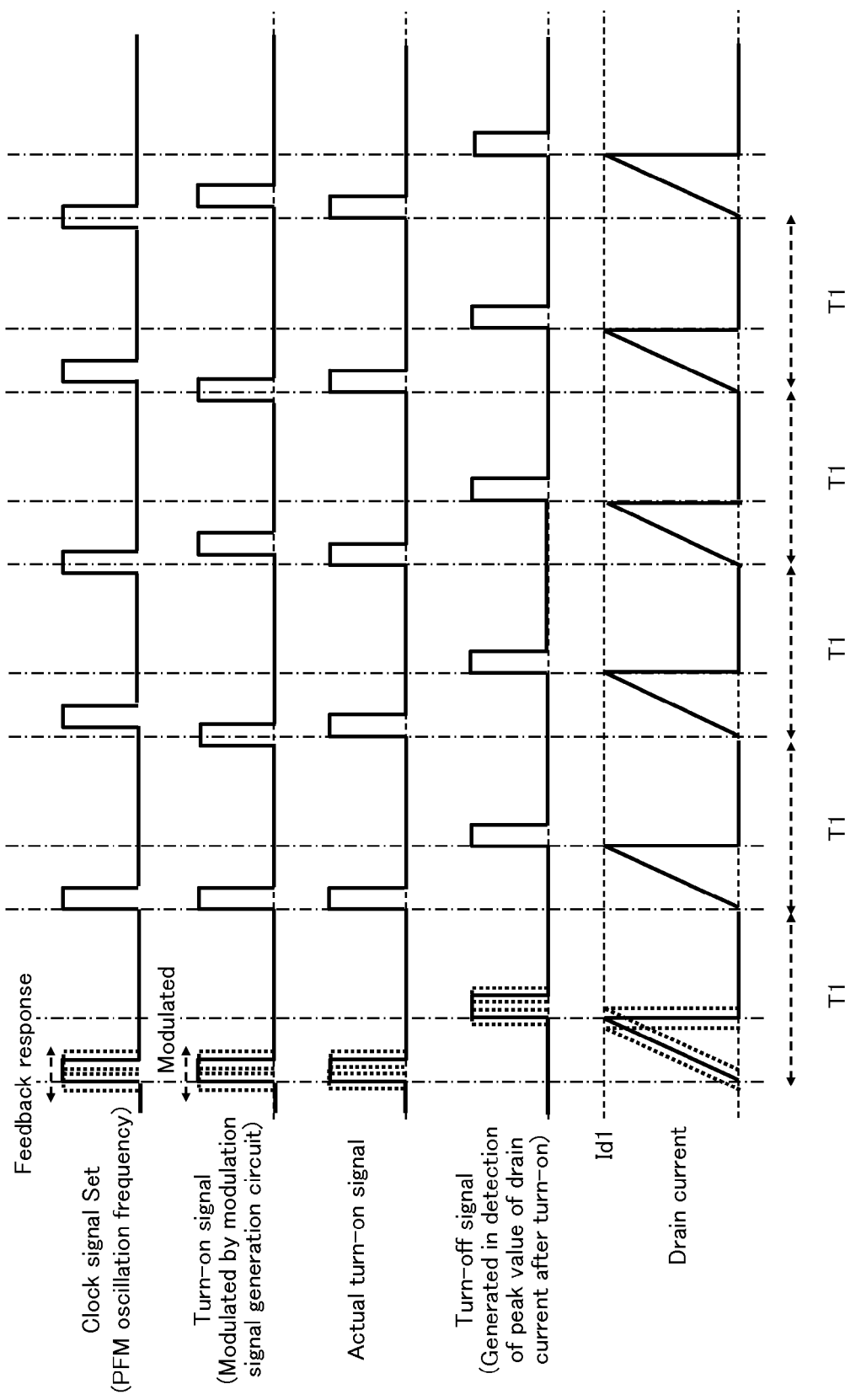
FIG. 12 is a timing chart showing modulation of a switching element in a switching power supply apparatus relating to a conventional example.

FIG. 11 is a timing chart showing modulation of the switching element under PFM control relating to the present embodiment. FIG. 12 is a timing chart showing modulation of the switching element under a conventional PFM control.

According to the present disclosure as shown in FIG. 11, a feedback signal and a modulation signal do not cancel each other, and accordingly frequency dispersion occurs in any circumstances. As a result, a cycle of oscillation frequency varies in cycles of T1, T2, T3, . . . as shown in FIG. 11. Therefore, the switching frequency is modulated by modulating a peak value of a current flowing through the switching element 2 between Id1 and Id3. This easily reduces the average value of terminal noise due to leakage of a switching frequency of a switching operation and harmonic components thereof from the commercial power supply to the outside.

Furthermore, it is possible to reduce sound generation of the transformer 1 due to the switching operation in an audible frequency region under PFM control, by dispersing spectrum components of the frequency in the same manner as described above.

According to a conventional PFM control as shown in FIG. 12, a feedback signal and a modulation signal cancel each other, and accordingly a cycle of oscillation frequency is fixed to cycle T1 even if a turn-on signal is modulated. As a result, there often occurs a case where a switching frequency and harmonic component thereof are not appropriately dispersed.

Figure 16:
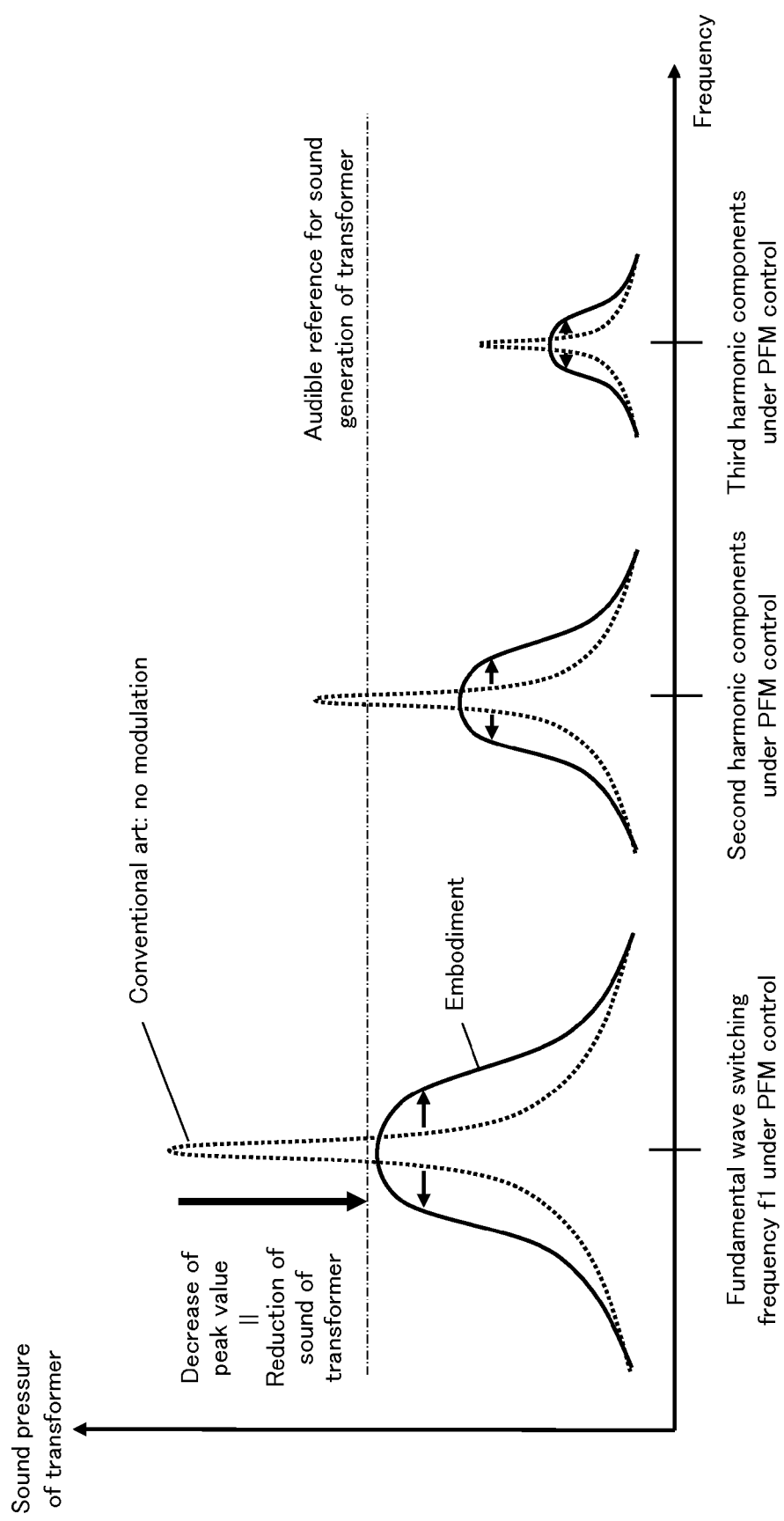
FIG. 16 shows an example of relationship between frequency spectrum components and sound pressure of a transformer in PFM control.

FIG. 16 shows a relationship between a fundamental wave switching frequency fl of a clock signal Set output from the PFM control circuit 12 and a sound pressure of the transformer 1. The sound pressure of the transformer 1 on the vertical axis expresses an absolute amount of a level of sound of the transformer 1. The sound pressure of the transformer 1 here expresses fundamental wave frequency components and harmonic component of the sound pressure of the transformer 1.

According to the present embodiment as shown in FIG. 16, the fundamental wave switching frequency fl disperses and a peak value of the sound pressure of the transformer 1 decreases, compared with a conventional switching power supply apparatus. Accordingly, sound generation of the transformer 1 is reduced compared with the conventional switching power supply apparatus.

Sound generation of the transformer 1 is considered to occur due to that spectrum components of the switching frequency coincide with a resonance frequency of the transformer 1. With respect to the switching frequency of the switching element 2, only by avoiding a fundamental wave switching frequency from existing in an audible frequency region of 2 kHz to 20 kHz which is generally considered to be avoided, it is impossible to avoid a harmonic which is equal to an integral multiple of a fundamental wave switching frequency from existing in the audible frequency region. Therefore, sound generation cannot be prevented. Harmonic components are generated which are equal to an integral multiple, such as two times, three times, and n times, of the fundamental wave switching frequency. As the order of the integral multiple increases, the spectral intensity decreases. When harmonic components concentrate in a certain part of an audible region, sound generation occurs. For this reason, as shown in FIG. 16, even if fundamental wave switching frequency components are avoided from existing in an audible region, sound generation of the transformer 1 occurs with a small sound pressure unless harmonic components are avoided from existing in the audible region.

According to the present embodiment compared with this, control is not limited to diffusion of the fundamental wave switching frequency in the audible region and avoidance of the fundamental wave switching frequency from existing in the audible region. The frequency is diffused in a wide frequency band from the fundamental wave to the harmonic of the switching frequency. Therefore, it is possible to effectively prevent sound generation of the transformer compared with conventional arts for reducing sound generation.

Here, the modulation signal generation circuit 13 is described in detail with reference to FIG. 5.

The modulation signal generation circuit 13 outputs a current signal Jitter resulting from converting a triangular wave voltage which is output from the low-frequency oscillator 50 to a current by a V-I converter which is configured by an NPN bipolar transistor 51, a resistor 52, and P-MOSFETs 53 and 54.

The low-frequency oscillator 50 is described with reference to FIG. 6.

Figure 6:
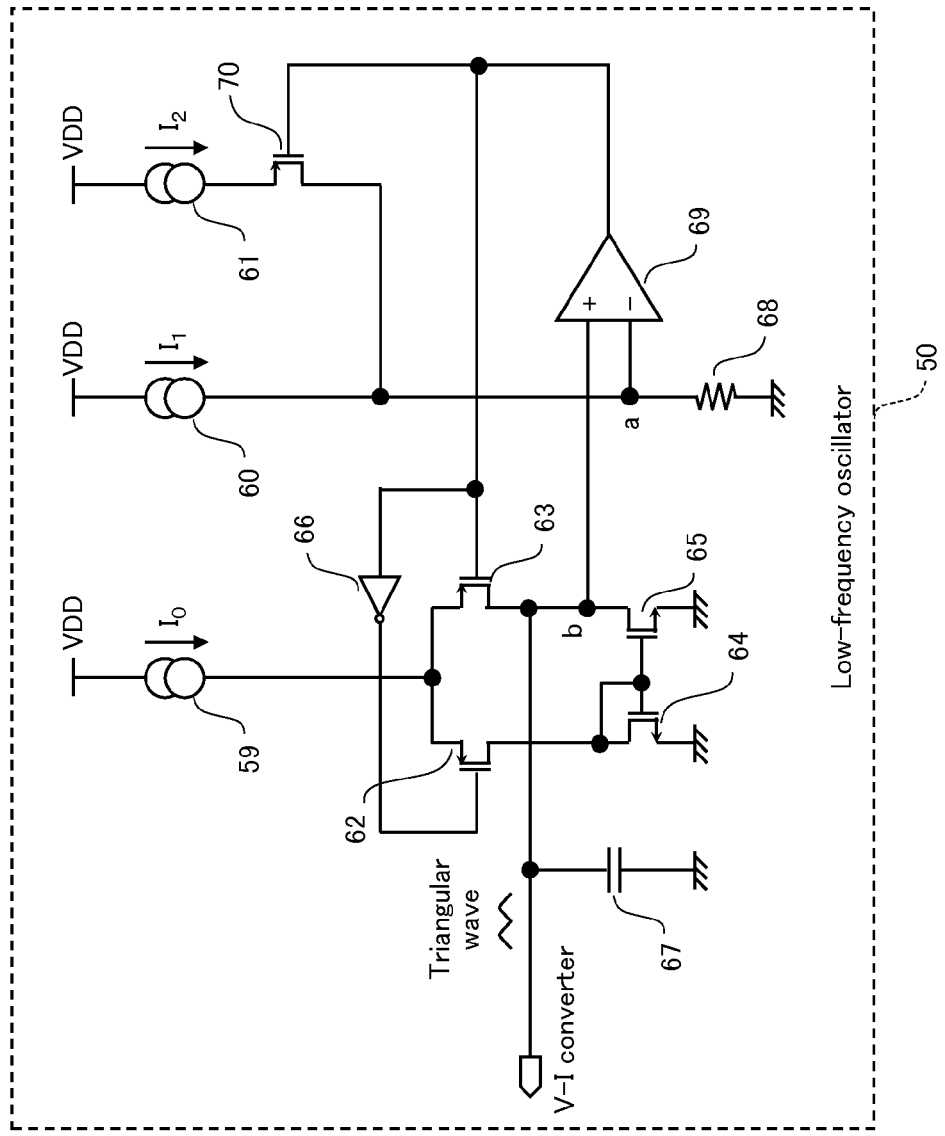
FIG. 6 is a circuit diagram of a low-frequency oscillator relating to Embodiment 1.

In FIG. 6, numeral references 59, 60, and 61 each represent a constant current source, numeral reference 67 represents a capacitor, numeral references 62 and 63 each represent a P-MOSFET, numeral references 64 and 65 each represent an N-MOSFET, numeral reference 66 represents an inverter circuit, numeral reference 68 represents a resistor, and numeral reference 69 represents a comparator. The N-MOSFETs 64 and 65 constitute a mirror circuit. Note that a voltage Va at a minus side of the comparator 69 is determined by the resistor 68 and the constant current sources 60 and 61. The voltage Va satisfies Va=$I_1 \times R_0$ when the P-MOSFET 70 is off, and satisfies Va=$(I_1+I_2) \times R_0$ when the P-MOSFET 70 is on, where $R_0$ denotes a resistance of the resistor 68, and $I_1$ and $I_2$ respectively denote current values of the constant current sources 60 and 61.

The following describes the operation of the low-frequency oscillator 50 having the configuration shown in FIG. 6.

When an L level signal is output from the comparator 69, the P-MOSFETs 63 and 70 are on. Also, since an H level signal is input to the gate via the inverter circuit 66, the P-MOSFET 62 is off. Here, the voltage Va at a minus side of the comparator 69 satisfies Va=$(I_1+I_2) \times R_0$. Also, since the P-MOSFET 63 is on, a constant current $I_0$ of the constant current source 59 flows to the capacitor 67 via the P-MOSFET 63. This results in increase of a voltage Vb at a point b that is a plus side of the comparator 69. When the voltage Vb at the point b exceeds the voltage Va=$(I_1+I_2) \times R_0$ at the point a, the output signal of the comparator 69 switches to an H level signal, and as a result the P-MOSFETs 63 and 70 switch off. Here, the voltage Va at the minus side of the comparator 69 satisfies Va=$(I_1+I_2) \times R_0$.

Also, since an L level signal is input to the gate via the inverter circuit 66, the P-MOSFET 62 is on. When the P-MOSFET 62 switches on, the constant current $I_0$ of the constant current source 59 flows to the N-MOSFET 64 via the P-MOSFET 62. The N-MOSFETs 64 and 65 constitute a mirror circuit. For this reason, if the mirror circuit has a mirror ratio of 1 for example, a current flowing through the N-MOSFET 65 is also the constant current $I_0$.

Therefore, the electrical charge stored in the capacitor 67 is extracted at the constant current $I_0$, and as a result the voltage Vb at the point b decreases. When the voltage Vb at the point b decreases to the voltage Va=$I_1 \times R_0$ at the point a, an L level signal is again output from the comparator 69. A time $T_M$ that is a time as one cycle of the triangular wave voltage is expressed as the following Expression 3, where $C_0$ denotes the capacitance value of the capacitor 67.

[Math 3]

$$T_M = 2 \times \frac{C_0 \times (I_2 \times R_0)}{I_0} \qquad \text{Expression 3}$$

As a result of repetition of the operation as described above, the triangular wave voltage, which is output from the low-frequency oscillator 50, continuously varies within a voltage range ($I_2 \times R_0$) of a first voltage value ($I_1 \times R_0$) to a second voltage value (($I_1-I_2) \times R_0$) at a cycle $T_M$.

In this way, the generated triangular wave voltage Vf (t), which is output from the low-frequency oscillator 50 is input to the V-I converter included in the modulation signal generation circuit 13, and thereby to be modulated to the current Jitter. In accordance with this modulation, the peak value ILIMIT of the current flowing through the switching element 2 is modulated. Therefore, even if the input voltage Vin and the load current Io are constant, the switching frequency f does not concentrate in a certain frequency, and thereby switching noise is diffused.

Note that the cycle $T_M$ of the low-frequency oscillator 50 should desirably be several hundred Hz to several kHz.

<Modifications of Embodiment 1 >
<Modification 1 >

A switching power supply apparatus relating to Modification 1 of Embodiment 1 is substantially the same as the switching power supply apparatus relating to Embodiment 1, except for a method of modulating the peak value of the current flowing through the switching element.

Figure 8:
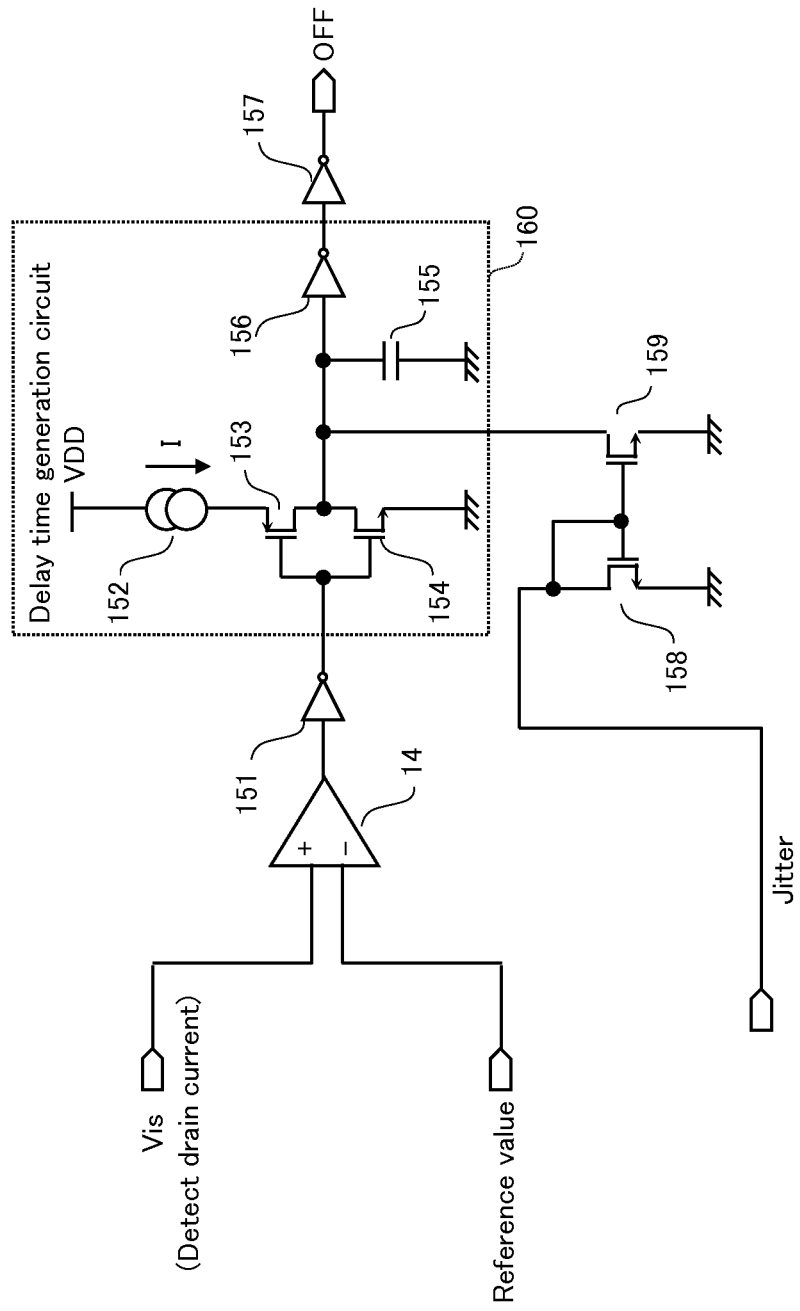
FIG. 8 is a circuit diagram of a turn-off control circuit relating to Modification 1 of Embodiment 1.

FIG. 8 is a circuit diagram of a turn-off control circuit 150 relating to Modification 1 of Embodiment 1. Reference numerals 151, 156, and 157 each represent an inverter circuit, reference numeral 152 represents a constant current source, reference numeral 153 represents a P-MOSFET, reference numerals 154, 158, and 159 each represent an N-MOSFET, and reference numeral 155 represents a smoothing capacitor. The N-MOSFETs 158 and 159 constitute a mirror circuit.

In the turn-off control circuit 150 relating to Embodiment 1, the peak value of the current flowing through the switching element 2 is modulated by modulating the reference voltage input as a voltage at the minus side of the comparator 14. In the turn-off control circuit 150 relating to Modification 1 compared with this, the peak value of the current flowing through the switching element 2 is modulated by providing a delay time for an output signal OFF of a comparator 14, and modulating the delay time.

The following describes the operation of a drain current limiting circuit including the turn-off control circuit 150.

When a signal for limiting the peak value of the current flowing through the switching element 2 is input to a delay time generation circuit 160 from the comparator 14, the P-MOSFET 153 switches on, and a charging current flows through the smoothing capacitor 155 from the constant current source 152. When the inverter circuit 156 inverts, the delay time generation circuit 160 outputs a turn-off control signal OFF. In other words, the switching element 2 does not turn off immediately after the peak value of the current flowing through the switching element 2 reaches a value corresponding to the feedback signal. The switching element 2 turns off when the delay time elapses after the peak value of the current reaches the corresponding value.

The current corresponding to the current signal Jitter, which is output from the modulation signal generation circuit 13, is subtracted from the current for charging the capacitor of the delay time generation circuit 160, thereby to modulate the delay time. As a result, the peak value of the drain current flowing through the switching element 2 is modulated.

The switching power supply apparatus relating to Modification 1 of Embodiment 1 exhibits substantially the same effects as those of the switching power supply apparatus relating to Embodiment 1.

Also, the delay time generation circuit 160 may be provided downstream of the AND circuit 15, instead of downstream of the comparator 14, so as to provide a delay time for a signal which is input to the reset (R) of the RS flip-flop circuit 17.

Figure 5:
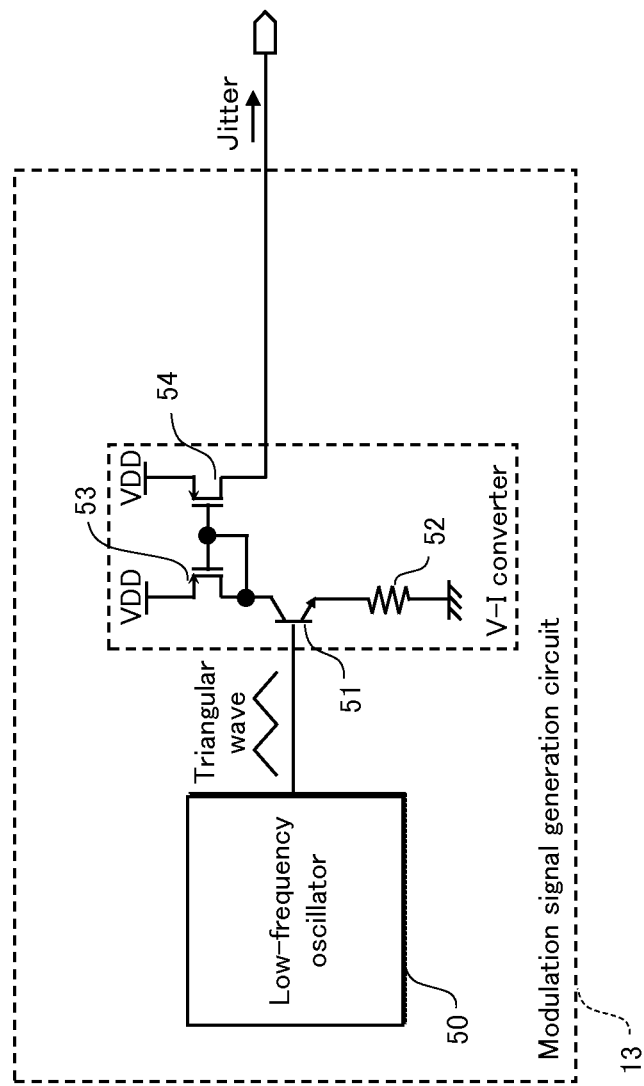
FIG. 5 is a circuit diagram of a modulation signal generation circuit relating to Embodiment 1.

Here, the modulation signal generation circuit 13 shown in FIG. 5 is described. Assume here that the mirror ratio of the P-MOSFETs 53 and 54 constituting the mirror circuit is 1:1, for example. A current If (t) flowing in the on-state to the capacitor 155 is expressed as the following Expression 4, where Vf (t) denotes a voltage output from the low-frequency oscillator 50, $R_0$ denotes a resistance of the resistor 52, $Vbe_0$ denotes a B-E voltage of the NPN bipolar transistor 51, and $I_0$ denotes a constant current of the constant current source 152.

[Math 4]

$$If(t) = I_0 - \frac{Vf(t) - Vbe_0}{R_0} \qquad \text{Expression 4}$$

Since the output voltage Vf (t) cyclically and continuously varies within the voltage range of the first voltage value to the second voltage value, the current If (t) cyclically and continuously varies within the current range of the first current value to the second current value.

Charging of the capacitor 155 with the current If (t) increases the potential of the capacitor 155. When the potential exceeds a threshold voltage value of the inverter circuit 156, an output signal of the inverter circuit 156 switches to an L level signal. An H level signal is output as an output signal OFF via the inverter circuit 157.

A delay time tf (t) is expressed as the following Expression 5, which is a time from when the P-MOSFET 153 switches on to when the output of the inverter circuit 156 switches from the H level to the L level, in other words, a delay time from when an H level signal is input to the current detection terminal to when the output terminal OFF switches to the H level.

[Math 5]

$$tf(t) = \frac{C \times Vt}{If(t)} \qquad \text{Expression 5}$$

Here, Vt denotes the threshold voltage value of the inverter circuit 156, and C denotes the capacitance value of the capacitor 155.

As described above, the triangular wave voltage Vf (t), which is output from the low-frequency oscillator 50, varies within the voltage range of the first voltage value to the second voltage value, and accordingly the current If (t) cyclically and continuously varies within the current range of the first current value to the second current value.

As a result, the delay time tf (t) of the signal cyclically and continuously varies within a time range of a first delay time to a second delay time, as clear from Expression 5. In other words, an H level signal, which is output from the comparator 14, is input to the AND circuit 15 via the turn-off control circuit 150 after elapse of the delay time tf (t). This turns off the switching element 2.

As described above, the switching element 2 does not turns off immediately after detection of the current flowing through the switching element 2, but actually turns off when the delay time tf (t), which is determined by the turn-off control circuit 150, elapses after detection of the current. In other words, the amount of the current actually flowing through the switching element 2 is determined in accordance with the delay time tf (t) after current detection, the input voltage Vin, and a primary inductance LP of the transformer 1.

As described above, since the delay time tf (t) cyclically and continuously varies within the time range of the first delay time to the second delay time, the current flowing through the switching element 2 cyclically and continuously varies within the current range of the first current value to the second current value.

In this way, the triangular wave voltage Vf (t), which is output from the low-frequency oscillator 50, is modulated thereby to modulate the current If (t), which is converted by the V-I converter included in the modulation signal generation circuit 13. In accordance with this modulation, the delay time tf (t) after detection of the current flowing through the switching element 2 is modulated. As a result, the peak value of the drain current flowing through the switching element 2 is modulated. Therefore, even if the input voltage Vin and the load current Io are constant, switching noise is diffused with no concentration of the switching frequency f in a certain frequency by modulating the peak value of the drain current flowing through the switching element 2.

<Modification 2>

Figure 9:
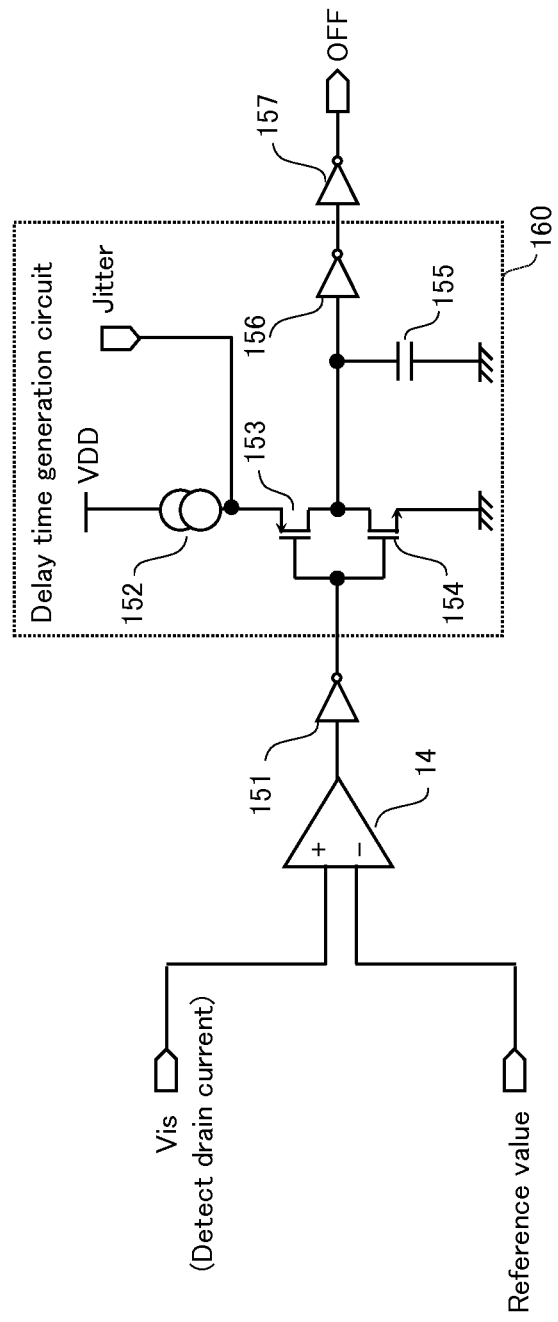
FIG. 9 is a circuit diagram of a turn-off control circuit relating to Modification 2 of Embodiment 1.

FIG. 9 is a circuit diagram of a turn-off control circuit 150 relating to Modification 2 of Embodiment 1.

The turn-off control circuit 150 adds a current for charging a capacitor of a delay time generation circuit 160 and a current corresponding to a current signal Jitter which is output from a modulation signal generation circuit 13, thereby to modulate a delay time.

<Modification 3>

Figure 10:
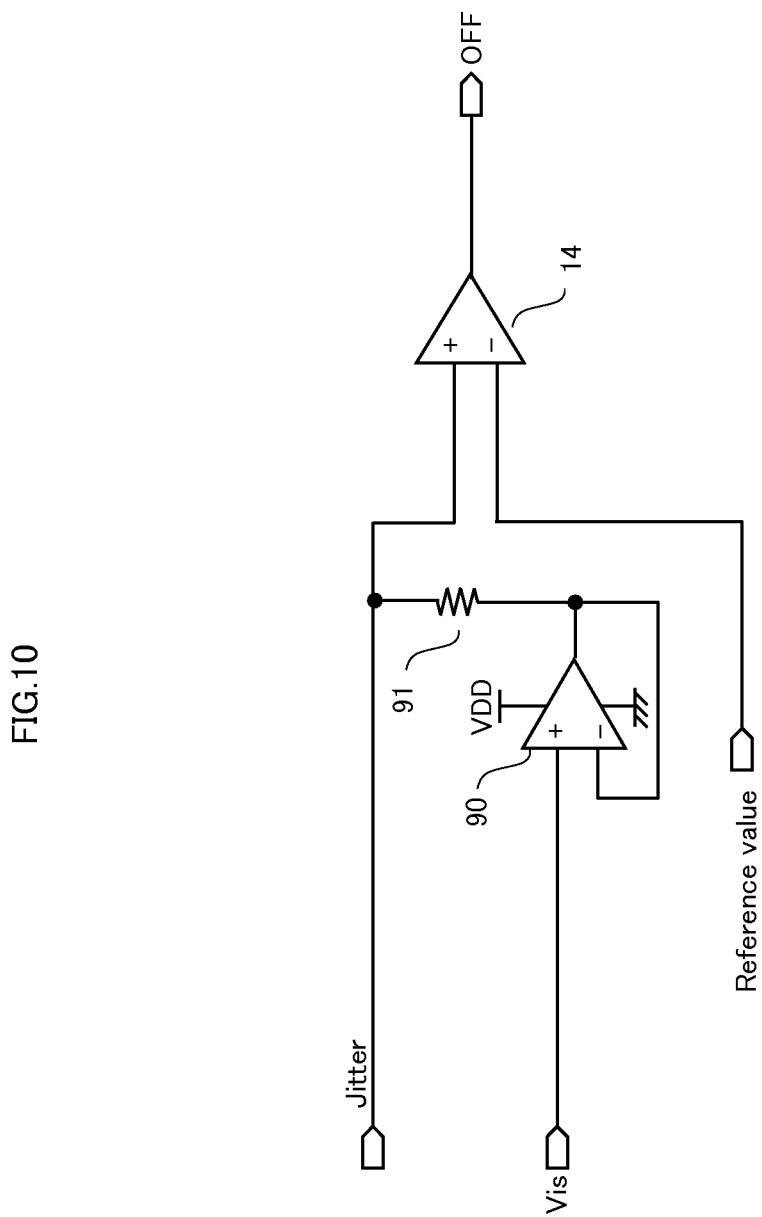
FIG. 10 is a circuit diagram of a turn-off control circuit relating to Modification 3 of Embodiment 1.

FIG. 10 is a circuit diagram of a turn-off control circuit 150 relating to Modification 3 of Embodiment 1.

The turn-off control circuit 150 modulates an output signal Vis of a drain current detection circuit 20 which is input as a voltage of a plus side of a comparator 14, thereby to modulate a peak value of a current flowing through a switching element 2. The operating principle of modulation is substantially the same as that of Embodiment 1, and accordingly detailed description thereof is omitted here.

The switching power supply apparatus relating to Modification 3 of Embodiment 1 exhibits substantially the same effects as those of the switching power supply apparatuses relating to Embodiment 1 and Modifications 1 and 2 of Embodiment 1.

<Modification 4>

A switching power supply apparatus relating to Modification 4 of Embodiment 1 is substantially the same as the switching power supply apparatus relating to Embodiment 1, except for a method of generating a modulation signal.

Figure 13:
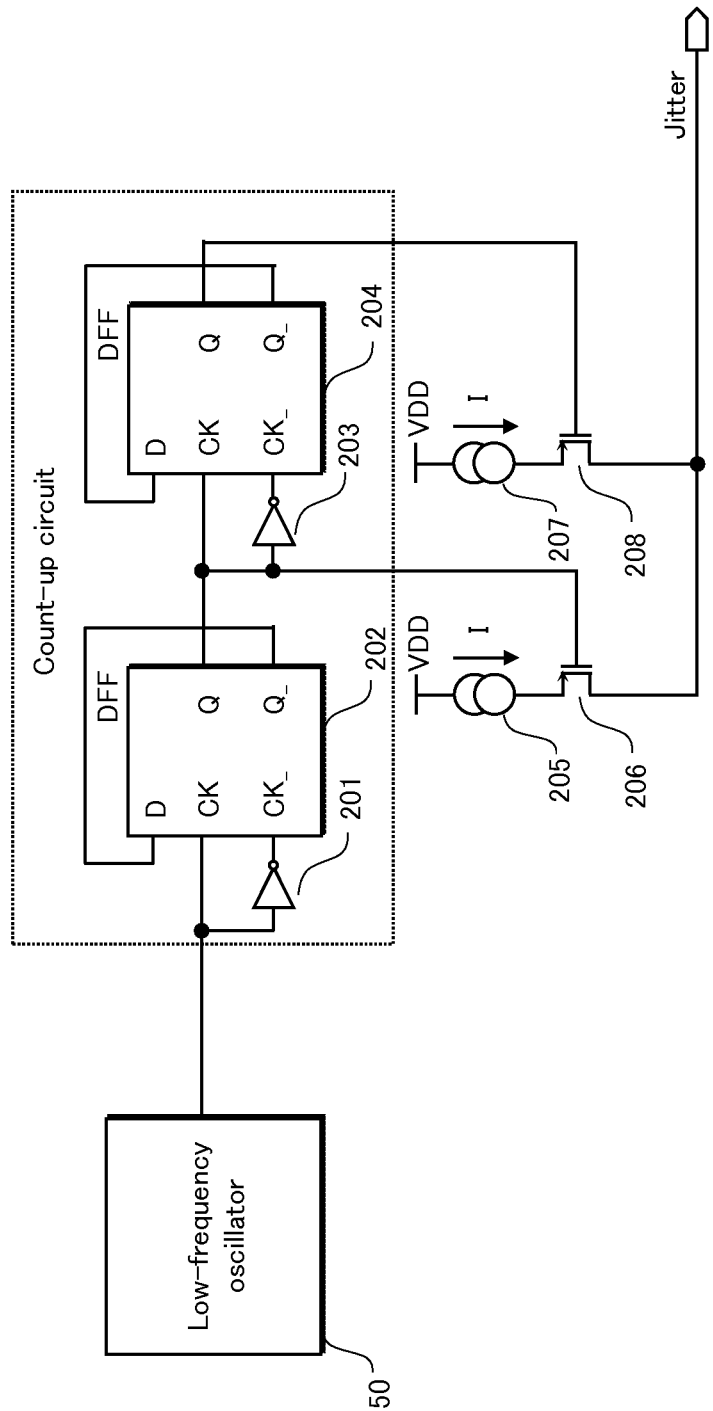
FIG. 13 is a circuit diagram of a modulation signal generation circuit relating to Modification 4 of Embodiment 1.

FIG. 13 shows an example of a specific circuit configuration of a modulation signal generation circuit 13 included in a switching power supply apparatus relating to Modification 4 of Embodiment 1.

Reference numerals 201 and 203 each represent an inverter circuit, reference numerals 202 and 204 each represent a D flip-flop circuit, reference numerals 205 and 207 each represent a constant current source, and reference numerals 206 and 208 each represent a P-MOSFET.

In the modulation signal generation circuit 13 included in the switching power supply apparatus relating to Embodiment 1, the triangular wave output from the low-frequency oscillator 50 is output as a modulation signal after conversion by the V-I converter. The cycle of the modulation signal is equal to the cycle of the low-frequency oscillator 50. In the modulation signal generation circuit 13a included in the switching power supply apparatus relating to Modification 4 compared with this, the number of times the triangular wave generated by the low-frequency oscillator 50 reaches the upper limit is counted by a count-up circuit which is configured by the D flip-flop circuit for example, and a current corresponding to the counted number of times is output as a modulation signal. In other words, the cycle of the modulation signal output from the modulation signal generation circuit 13a is equal to an integral multiple of the cycle of the low-frequency oscillator 50.

This makes it possible to easily lengthen the cycle of the modulation signal. Accordingly, even when the switching frequency is low under PFM control, a modulation signal can be easily generated which has a cycle sufficiently longer than the switching frequency at this time. For example, it is possible to decrease a capacitance value of the capacitor 67 included in the low-frequency oscillator 50, thereby exhibiting an effect of reducing the size of semiconductor chip.

Note that, as the capacitor 67 included in the low-frequency oscillator 50, a capacitor may be used which is connected with an external terminal, instead of a capacitor provided in the semiconductor device. With this configuration, it is possible not only to easily generate a modulation signal having a relatively long cycle, but also to externally perform adjustment in accordance with the specifications of the switching power supply apparatus.

According to Modification 4, the switching frequency of the switching element 2 is cyclically and discretely (digitally) modulated by the count-up circuit, compared with Embodiment 1 and Modifications of 1 to 3 according to which the switching frequency of the switching element 2 is cyclically and continuously modulated. In other words, according to Modification 4, it is possible to cyclically modulate the switching frequency by performing discrete (digital) step-up or step-down of the peak value of the current per switching.

As described above, the switching power supply apparatus relating to Modification 4 of Embodiment 1 exhibits substantially the same effects as those of the switching power supply apparatuses relating to Embodiment 1 and Modifications 1 to 3 of Embodiment 1.

<Embodiment 2>

The following describes a switching power supply apparatus relating to Embodiment 2 of the present disclosure.

Figure 14:
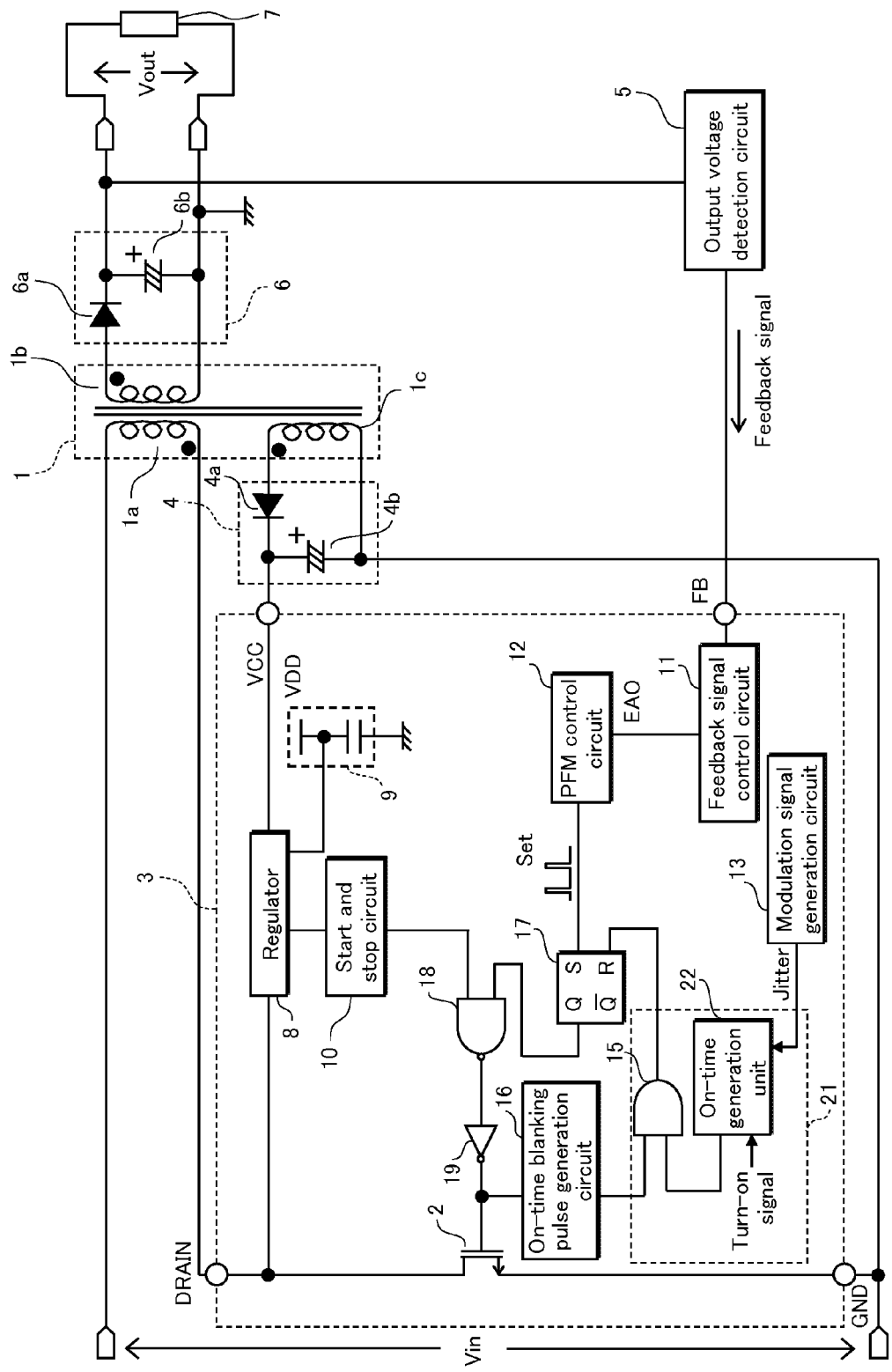
FIG. 14 is a circuit diagram of a switching power supply apparatus relating to Embodiment 2.

FIG. 14 is a circuit diagram of the switching power supply apparatus relating to present embodiment.

The switching power supply apparatus relating to the present embodiment differs in terms of the following point from the switching power supply apparatus relating to Embodiment 1 shown in FIG. 1. In the switching power supply apparatus relating to Embodiment 1, the drain current is detected by the drain current detection circuit 20. When the current reaches the set reference value, the switching element 2 turns off. In the switching power supply apparatus relating to the present embodiment compared with this, an on-time generation circuit 22 is provided for always setting a fixed on-time irrespective of a value of a current flowing through a switching element 2. When turn-on of the switching element 2 is detected, a turn-on signal is input to an on-time generation circuit 22, and an on-time that is a time at which the current flows through the switching element 2 reaches the value set by the on-time generation circuit 22, the on-time generation circuit 22 generates a signal for turning off the switching element 2.

Through the above control, PFM control is realized with a fixed on-time. Also, like in Embodiment 1, by varying the switching frequency in accordance with the load state (output state), control is performed such that the output voltage is maintained constant.

The on-time generation circuit 22 has substantially the same configuration as the delay time generation circuit 160 relating to Modification 1 of Embodiment 1. Specifically, the on-time generation circuit 22 detects turn-on of the switching element 2, and then outputs a turn-off signal after elapse of a certain time, namely, an on-time.

According to the switching power supply apparatus relating to the present embodiment, the on-time of the switching element 2 is cyclically modulated within a time range of a first time to a second time in accordance with the signal Jitter output from the modulation signal generation circuit 13, thereby to modulate the peak value of the drain current to modulate the switching frequency.

As described above, the switching power supply apparatus relating to the present embodiment exhibits substantially the same effects as those of the switching power supply apparatuses relating to Embodiment 1 and Modifications 1 to 4 of Embodiment 1.

Alternatively, like in Modification 1 of Embodiment 1, the peak value of the drain current may be modulated by providing a certain delay time for a turn-off signal and modulating the delay time. Further alternatively, like in Modification 4 of Embodiment 1, the switching frequency may be discretely varied by the count-up circuit with use of the modulation signal generation circuit 13.

<Embodiment 3>

The following describes a switching power supply apparatus relating to Embodiment 3 of the present disclosure.

Figure 15:
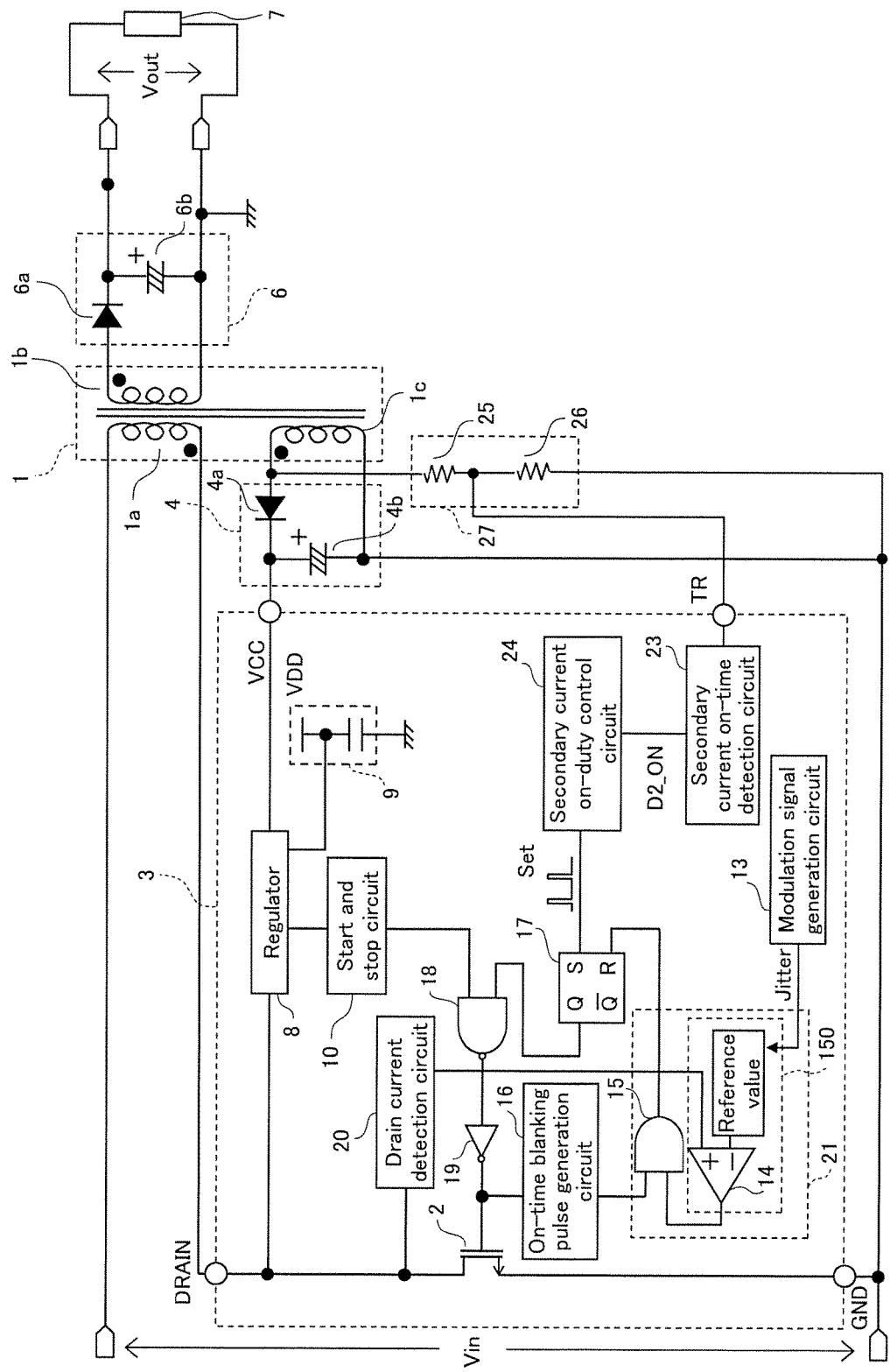
FIG. 15 is a circuit diagram of a switching power supply apparatus relating to Embodiment 3.

FIG. 15 is a circuit diagram of the switching power supply apparatus relating to present embodiment.

The switching power supply apparatus relating to the present embodiment basically has the same circuit configuration as that of the switching power supply apparatus relating to Embodiment 1. The switching power supply apparatus relating to the present embodiment differs from the switching power supply apparatus relating to Embodiment 1 in terms of that a TR terminal is used instead of the FB terminal, an off-timing of a secondary current is detected by the TR terminal, and the on-duty of the secondary current is adjusted in a certain load range such that the load state maintains an output current at a constant value.

A rectifying and smoothing circuit 4 which is configured by a rectifying diode 4a and a smoothing capacitor 4b is connected with an auxiliary coil 1c. The rectifying and smoothing circuit 4 rectifies and smoothes an auxiliary AC voltage, which is induced in the auxiliary coil 1c due to a switching operation of a switching element 2, to convert to an auxiliary power source voltage VCC, and supplies the auxiliary power source voltage VCC to a VCC terminal of a control circuit 3. In other words, the rectifying and smoothing circuit 4 is used as an auxiliary power unit of the control circuit 3.

Also, two resistors 25 and 26 are connected with the auxiliary coil 1c, and a TR terminal is connected with a connection point between the resistors 25 and 26. Accordingly, a TR terminal voltage VTR which results from dividing the auxiliary AC voltage is applied to the TR terminal. As described below, the control circuit 3 detects an off-timing of a secondary current based on the TR terminal voltage VTR. The off-timing indicates a timing when the secondary current, which starts flowing through the secondary coil 1b of the transformer 1 upon turn-off the switching element 2, stops flowing.

The following describes a control circuit 3.

The control circuit 3 controls the switching operation of the switching element 2 to make the output current of the switching power supply apparatus constant in a certain load range, such that an on-duty ratio of a first time (on-time of the secondary current) to a third time which is a sum of the first time and a second time (off-time of the secondary current) is constant, that is, such that an on-duty of the secondary current is constant. Also, the control circuit 3 cyclically modulates the switching frequency of the switching element 2 to reduce noise.

A secondary current on-time detection circuit 23 is connected with the TR terminal. The secondary current on-time detection circuit 23 detects an on-time of the secondary current based on the TR terminal voltage VTR and a signal generated in the control circuit 3, thereby to generate a detection signal D2_ON indicating the on-time of the secondary current. The detection signal D2_ON is a logic signal whose signal level is high in the on-time of the secondary current.

Specifically, the secondary current on-time detection circuit 23 detects a timing at which the secondary current starts flowing (on-timing of the secondary current) based on the signal generated in the control circuit 3, and also detects an off-timing of the secondary current based on the TR terminal voltage VTR.

In other words, according to the switching power supply apparatus of the flyback type, in the on-time of the switching element 2, a current flows through the primary coil 1a of the transformer 1 and energy is stored in the transformer 1. Also, in the off-time of the switching element 2, the energy stored in the transformer 1 is released and a current (secondary current) flows through the secondary coil 1b of the transformer 1. Then, when the value of the secondary current reaches zero, resonance phenomenon occurs due to an inductance of the transformer 1 and a parasitic capacitance of the switching element 2. This resonance phenomenon occurs in each of the coils of the transformer 1. According to the present embodiment, for this reason, the TR terminal is connected with the auxiliary coil 1c, and the secondary current on-time detection circuit 23 detects, as an off-timing of the secondary current, a falling timing which firstly appears in a waveform of an auxiliary AC voltage after turn-off of the switching element 2 (timing of polarity inversion of the voltage). Note that, in the case where the TR terminal is connected with the primary coil 1a instead of the auxiliary coil 1c, the secondary current on-time detection circuit 23 may detect a timing of polarity inversion of the voltage which firstly appears in the primary coil 1a after turn-off of the switching element 2.

The secondary current starts flowing when the switching element 2 turns off. Accordingly, the secondary current on-time detection circuit 23 detects, as the on-timing of the secondary current, the turn-off timing of the switching element 2. Here, the secondary current on-time detection circuit 23 detects falling of a drive signal generated by a gate driver 19.

A secondary current on-duty control circuit 24 oscillates a clock signal Set for turning off the switching element 2 based on the detection signal D2_ON indicating the on-time of the secondary current, so as to maintain the on-duty of the secondary current at a predetermined value (a constant value). Each time the clock signal Set rises, the RS flip-flop circuit 17 switches to a set state and the switching element 2 turns off. The switching frequency of the switching element 2 is determined based on this clock signal Set. As the current flowing through the load 7 increases and the on-time of the secondary current increases, the frequency of the clock signal Set decreases.

Here, as a conventional frequency modulation method, the on-duty is modulated by a circuit which includes a low-frequency oscillator that oscillates at a frequency sufficiently lower than the switching frequency of the switching element 2. The circuit generates a current signal Jitter (modulation signal) having the lower frequency, and operates the current signal Jitter so as to maintain a constant on-duty of a secondary current of a secondary current on-duty control circuit. According to this method, however, there is a case where a clock signal Set for determining a turn-on timing and a modulation signal cancel each other and as a result modulation effects are offset, like under PFM control. For this reason, the signal Vis, which is output from the drain current detection circuit, or the reference voltage, which is input at the minus side of the comparator 14 included in the drain current limiting circuit, is cyclically modulated in the same manner as that in Embodiment 1.

Alternatively, a delay time may be given for a turn-off signal output from the drain current limiting circuit thereby to cyclically modulate the delay time.

According to the modulation method described above, the switching frequency of the switching element 2 is cyclically modulated while maintaining the on-duty at a predetermined value, by applying modulation components to the peak value of the drain current which is maintained at a predetermined value (constant value). Therefore, the effects are exhibited which are substantially the same as those in Embodiment 1.

Also, modulation may be performed with use of the turn-off control circuit 150 such as described in Modifications 1 and 2 of Embodiment 1. Also, the same effects are exhibited with use of the configuration of on-time modulation such as described in Embodiment 2. Moreover, the switching frequency may be discretely modulated with use of the modulation signal generation circuit 13 such as described in Modification 4 of Embodiment 1.

Although the switching power supply apparatus relating to the present disclosure has been described based on the embodiments, the present disclosure is not limited by the embodiments. Without departing from the spirit of the present disclosure, the present disclosure includes embodiments to which various modifications made by a person skilled in the art are applied, embodiments configured by combination of components of different embodiments, and so on.

In the above embodiments, the semiconductor device is constituted by integrating the switching element 2 and the control circuit 3 on the same substrate. However, it is not particularly necessary to integrate the switching element 2 and the control circuit 3 on the same substrate.

In the above embodiments, a current is extracted from the FB terminal as a feedback signal output from the output voltage detection circuit 5. Alternatively, a current may be injected to the FB terminal. Also, the feedback signal may be detected from the voltage of the VCC terminal instead of from the output voltage of the secondary side.

In the above embodiments, the low-frequency oscillator 50 includes the resistor for determining the amplitude voltage of the triangular wave. Alternatively, a terminal may be provided in the control circuit 3 so as to externally adjust the resistor. Furthermore, regarding the capacitor for determining the cycle, a terminal may be provided in the control circuit 3 so as to externally connect the capacitor.

Also, the transformer 1 may include the primary coil 1a, the secondary coil 1b, and the auxiliary coil 1c where the primary coil 1a and the secondary coil 1b are equal in polarity to each other. In this case, the switching power supply apparatus is of a forward type.

INDUSTRIAL APPLICABILITY

According to the switching power supply apparatus and the semiconductor device relating to the present disclosure as described above, it is possible to stably and effectively reduce sounds generated by components such as a transformer and a ceramic capacitor and an average value of terminal noise in the switching power supply apparatus under PFM control, without deteriorating power efficiency compared with conventional arts. This allows the switching power supply apparatus having a limited operating frequency range for fear of sound generation and so on to perform frequency operations in a wide operating frequency range.

Also, the switching power supply apparatus and the semiconductor device relating to the present disclosure are utilizable for switching power supply apparatuses of AC-DC converters, DC-DC converters, and the like.

REFERENCE SIGNS LIST

1 transformer
1a primary coil
1b secondary coil
1c bias auxiliary coil
2 switching element
3 control circuit (semiconductor device)
4 rectifying and smoothing circuit
4a and 6a rectifying diode
4b, 6b, 67, 106, and 155 smoothing capacitor
5 output voltage detection circuit
6 output voltage generation unit
7 load
8 regulator
9 internal circuit voltage source
10 start and stop circuit
11 feedback signal control circuit
12 PFM control circuit
13 modulation signal generation circuit
14, 69, 107, and 108, comparator
15 AND circuit
16 on-time blanking pulse generation circuit
17 and 112 RS flip-flop circuit
18 NAND circuit
19 gate driver
20 drain current detection circuit
21 drain current limiting circuit
22 on-time generation unit
23 secondary current on-time detection circuit
24 secondary current on-duty control circuit
25, 26, 52, 68, 80, 91, 109, 110, and 117 resistor
27 auxiliary coil voltage dividing circuit
50 low-frequency oscillator
51 and 81 NPN bipolar transistor
53, 54, 62, 63, 70, 73, 74, 102, 103, 114, 115, 153, 206, and 208 P-MOSFET 66, 113, 130, 131, 132, 133, 151, 156, 157, 201, and 203 inverter circuit 64, 65, 75, 76, 77, 79, 104, 105, 116, 154, 158, and 159 N-MOSFET 59, 60, 61, 71, 72, 101, 152, 205, and 207 constant current source
78 and 82 constant voltage source
90 operational amplifier
100 oscillator
118 V-I converter
134 NOR circuit
150 turn-off control circuit
160 delay time generation circuit
202 and 204 D flip-flop circuit

The invention claimed is:

1. A switching power supply apparatus comprising:
a transformer that includes a primary coil and a secondary coil;
a switching element that is connected in series with the primary coil;
a control circuit configured to control a switching operation of the switching element to perform switching control on a first DC voltage that is input to the switching element via the primary coil;
an output voltage generation circuit configured to convert an AC voltage induced in the secondary coil to a second DC voltage, and supply an output current to a load; and
an output state detection circuit configured to output a feedback signal in accordance with the second DC voltage of the secondary coil or the output current of the secondary coil, wherein
the control circuit includes:
a turn-on signal generation circuit configured to generate a turn-on signal of the switching element, the turn-on signal being cyclic pulse signals, an oscillation frequency of which is adjusted, when the cyclic pulse signals are output, in accordance with the feedback signal such that the second DC voltage or the output current is constant; and
a turn-off signal generation circuit configured to generate, independently from the feedback signal, a turn-off signal of the switching element, and the turn-off signal generation circuit includes:
  a current detection circuit configured to detect a current flowing through the switching element and output a detection value corresponding to the current;
  a modulation signal generation circuit configured to generate a modulation signal that is a periodic signal; and
  a timing modulation circuit configured to modulate a generation timing of the turn-off signal in accordance with the modulation signal, wherein:
  the timing modulation circuit includes a comparator, and a reference value is input to one of input terminals of the comparator,
  the detection value output from the current detection circuit is input to another of the input terminals of the comparator, and
  the reference value is modulated in accordance with the modulation signal.

2. A semiconductor device for controlling the switching power supply apparatus of claim 1, wherein the control circuit is formed on a semiconductor substrate as an integrated circuit.

3. The switching power supply apparatus of claim 1, wherein the turn-on signal generation circuit includes:
  a feedback signal control circuit configured to output a frequency setting signal in accordance with the feedback signal, the frequency setting signal being for setting the oscillation frequency; and
  a PFM control circuit configured to generate the cyclic pulse signals, of which oscillation frequency is adjusted in accordance with the frequency setting signal, the turn-off signal generation circuit further includes:
  a current control circuit configured to, when the detection value reaches a first reference value, generate the turn-off signal, and
  the timing modulation circuit cyclically modulates a peak value of the current flowing through the switching element within a range of a first current value to a second current value.

4. The switching power supply apparatus of claim 1, wherein:
  the turn-on signal generation circuit includes:
    a secondary current on-time detection circuit configured to detect a first time in which a secondary current flows through the secondary coil after the switching element turns off; and
    a secondary current on-duty control circuit configured to generate the cyclic pulse signals such that a ratio of the first time to a third time is constant, the third time being a sum of the first time and a second time in which the secondary current does not flow through the secondary coil,
  the turn-off signal generation circuit further includes:
    a current control circuit configured to, when the detection value reaches a first reference value, generate the turn-off signal, and
  the timing modulation circuit cyclically modulates a peak value of the current flowing through the switching element within a range of a first current value to a second current value.

5. The switching power supply apparatus of claim 1, wherein
  when a consumption current of the load is equal to or higher than a predetermined value, the switching power supply apparatus operates under PWM control or quasi-resonant control, and
  when the consumption current of the load is less than the predetermined value, the switching power supply apparatus operates at the oscillation frequency in accordance with the feedback signal.

6. A switching power supply apparatus comprising:
  a transformer that includes a primary coil and a secondary coil;
  a switching element that is connected in series with the primary coil;
  a control circuit configured to control a switching operation of the switching element to perform switching control on a first DC voltage that is input to the switching element via the primary coil;
  an output voltage generation circuit configured to convert an AC voltage induced in the secondary coil to a second DC voltage, and supply an output current to a load; and
  an output state detection circuit configured to output a feedback signal in accordance with the second DC voltage of the secondary coil or the output current of the secondary coil, wherein:
  the control circuit includes:
    a turn-on signal generation circuit configured to generate a turn-on signal of the switching element, the turn-on signal generation circuit including an oscillator configured to generate, as the turn-on signal, cyclic pulse signals having an oscillation frequency which is adjusted in accordance with the feedback signal such that the second DC voltage or the output current is constant; and
    a turn-off signal generation circuit configured to generate, independently from the feedback signal, a turn-off signal of the switching element, and the turn-off signal generation circuit includes:
      a current detection circuit configured to detect a current flowing through the switching element and output a detection value corresponding to the current;
      a modulation signal generation circuit configured to generate a modulation signal that is a periodic signal; and
      a timing modulation circuit configured to modulate a generation timing of the turn-off signal in accordance with the modulation signal, wherein:
      the timing modulation circuit includes a comparator, and a reference value is input to one of input terminals of the comparator,
      the detection value output from the current detection circuit is input to another of the input terminals of the comparator, and
      the reference value is modulated in accordance with the modulation signal.

7. The switching power supply apparatus of claim 6, wherein:
  the turn-on signal generation circuit further includes a feedback signal control circuit configured to output a frequency setting signal to the oscillator in accordance with the feedback signal, and
  the oscillator generates the turn-on signal according to the frequency setting signal.

8. The switching power supply apparatus of claim 6, wherein:
  the turn-off signal generation circuit further includes:
    a current control circuit configured to, when the detection value reaches a first reference value, generate the turn-off signal, and the timing modulation circuit cyclically modulates a peak value of the current flowing through the switching element within a range of a first current value to a second current value.

9. A switching power supply apparatus comprising:
a transformer that includes a primary coil and a secondary coil;
a switching element that is connected in series with the primary coil;
a control circuit configured to control a switching operation of the switching element to perform switching control on a first DC voltage that is input to the switching element via the primary coil;
an output voltage generation circuit configured to convert an AC voltage induced in the secondary coil to a second DC voltage, and supply an output current to a load; and
an output state detection circuit configured to output a feedback signal in accordance with the second DC voltage of the secondary coil or the output current of the secondary coil, wherein
the control circuit includes:
  a turn-on signal generation circuit configured to generate a turn-on signal of the switching element, the turn-on signal being cyclic pulse signals, an oscillation frequency of which is adjusted, when the cyclic pulse signals are output, in accordance with the feedback signal such that the second DC voltage or the output current is constant; and
  a turn-off signal generation circuit configured to generate, independently from the feedback signal, a turn-off signal of the switching element, and
the turn-off signal generation circuit includes:
  a current detection circuit configured to detect a current flowing through the switching element and output a detection value corresponding to the current;
  a modulation signal generation circuit configured to generate a modulation signal that is a periodic signal; and
  a timing modulation circuit configured to modulate a generation timing of the turn-off signal in accordance with the modulation signal, wherein:
  the timing modulation circuit includes a comparator, and a reference value is input to one of input terminals of the comparator,
  the detection value output from the current detection circuit is input to another of the input terminals of the comparator, and
  the detection value is modulated in accordance with the modulation signal.

10. A semiconductor device for controlling the switching power supply apparatus of claim 9, wherein the control circuit is formed on a semiconductor substrate as an integrated circuit.

11. The switching power supply apparatus of claim 9, wherein
the turn-on signal generation circuit includes:
  a feedback signal control circuit configured to output a frequency setting signal in accordance with the feedback signal, the frequency setting signal being for setting the oscillation frequency; and
  a PFM control circuit configured to generate the cyclic pulse signals, of which oscillation frequency is adjusted in accordance with the frequency setting signal,
the turn-off signal generation circuit further includes:
  a current control circuit configured to, when the detection value reaches a first reference value, generate the turn-off signal, and
the timing modulation circuit cyclically modulates a peak value of the current flowing through the switching element within a range of a first current value to a second current value.

12. The switching power supply apparatus of claim 9, wherein:
the turn-on signal generation circuit includes:
  a secondary current on-time detection circuit configured to detect a first time in which a secondary current flows through the secondary coil after the switching element turns off; and
  a secondary current on-duty control circuit configured to generate the cyclic pulse signals such that a ratio of the first time to a third time is constant, the third time being a sum of the first time and a second time in which the secondary current does not flow through the secondary coil,
the turn-off signal generation circuit further includes:
  a current control circuit configured to, when the detection value reaches a first reference value, generate the turn-off signal, and
the timing modulation circuit cyclically modulates a peak value of the current flowing through the switching element within a range of a first current value to a second current value.

13. The switching power supply apparatus of claim 9, wherein
when a consumption current of the load is equal to or higher than a predetermined value, the switching power supply apparatus operates under PWM control or quasi-resonant control, and
when the consumption current of the load is less than the predetermined value, the switching power supply apparatus operates at the oscillation frequency in accordance with the feedback signal.

* * * * *